Dec. 9, 1924.

J. T. DALTON 1,518,310

PACKAGING AND TYING MECHANISM

Filed Feb. 16, 1924    13 Sheets-Sheet 5

INVENTOR
John T. Dalton
BY
Meyers & Cavanagh
HIS ATTORNEYS

Dec. 9, 1924.

J. T. DALTON 1,518,310

PACKAGING AND TYING MECHANISM

Filed Feb. 16, 1924 13 Sheets-Sheet 6

INVENTOR
John T. Dalton
BY
Meyers & Cavanagh
HIS ATTORNEYS

Dec. 9, 1924.　　　　　　　　　　　　　　　　　　　　1,518,310
J. T. DALTON
PACKAGING AND TYING MECHANISM
Filed Feb. 16, 1924　　　13 Sheets-Sheet 7
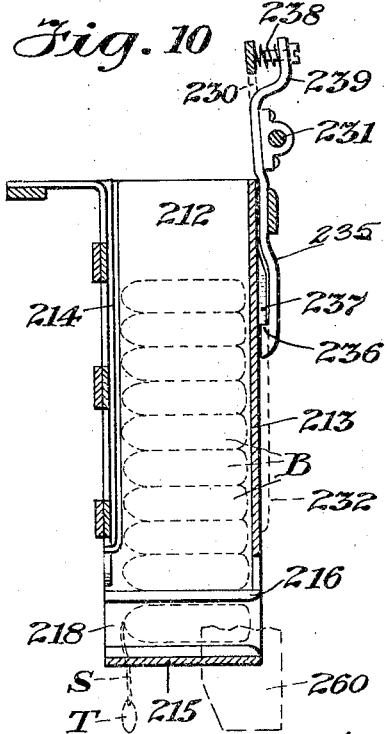
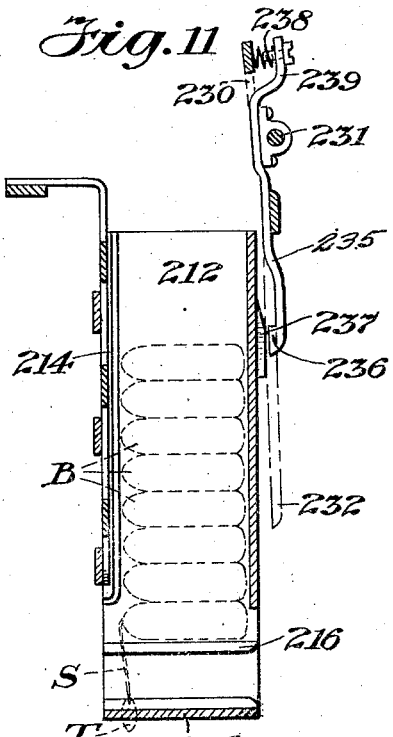
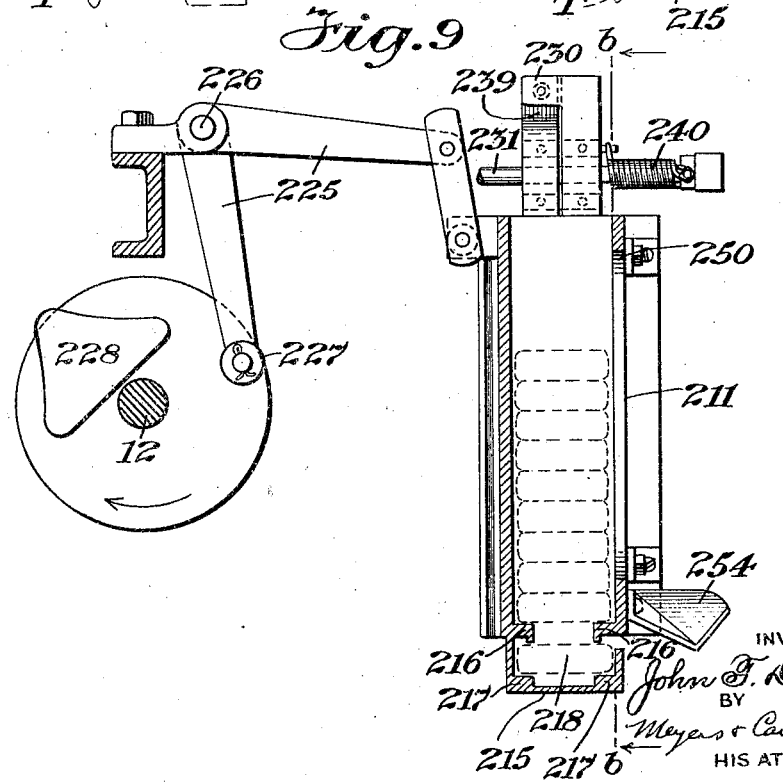
INVENTOR
John T. Dalton
BY
Meyers & Cavanagh
HIS ATTORNEYS

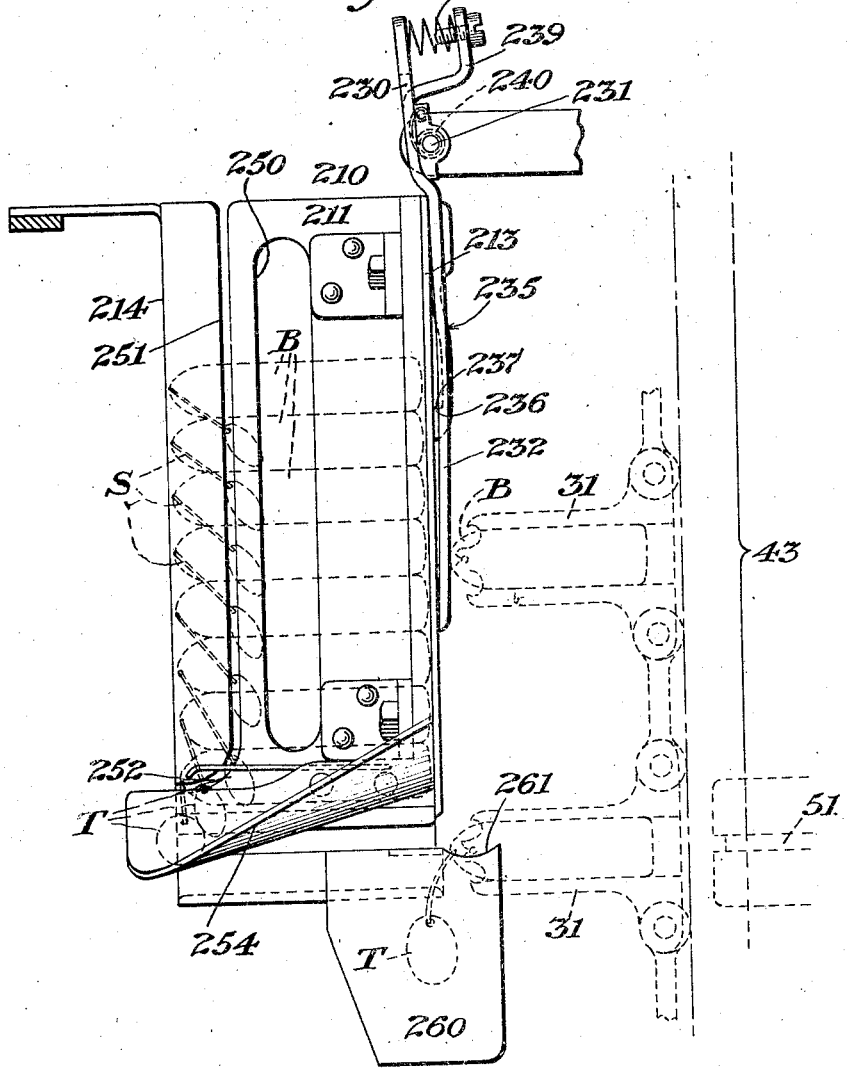

Dec. 9, 1924.                                                          1,518,310
J. T. DALTON
PACKAGING AND TYING MECHANISM
Filed Feb. 16, 1924          13 Sheets-Sheet 9
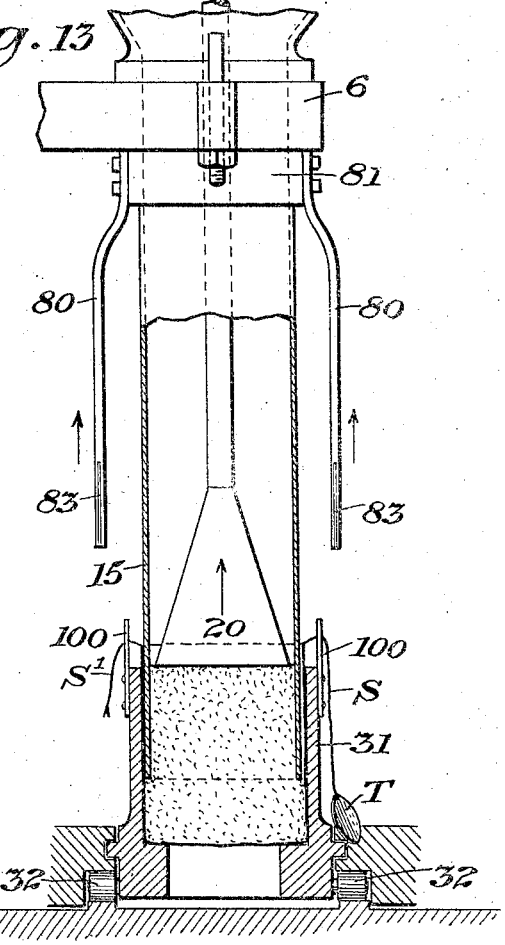
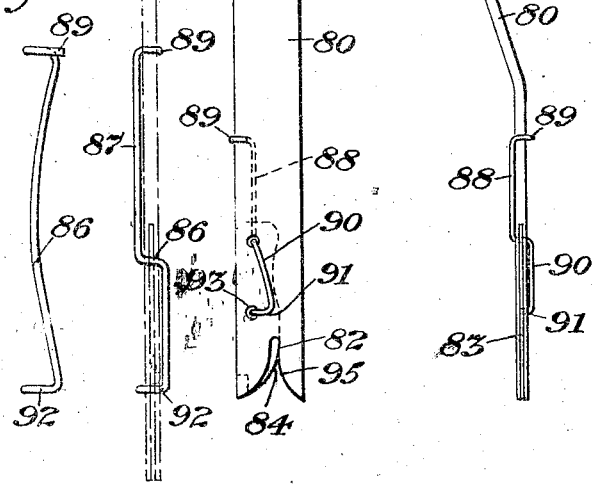
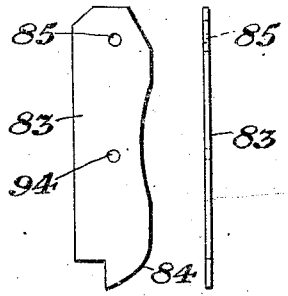
INVENTOR
John T. Dalton
BY
Meyers & Cavanagh
HIS ATTORNEYS Dec. 9, 1924.

J. T. DALTON

PACKAGING AND TYING MECHANISM

Filed Feb. 16, 1924    13 Sheets-Sheet 10

1,518,310

INVENTOR
John T. Dalton
BY
Meyers & Cavanagh
HIS ATTORNEYS

Dec. 9, 1924.
J. T. DALTON
1,518,310
PACKAGING AND TYING MECHANISM
Filed Feb. 16, 1924
13 Sheets-Sheet 11
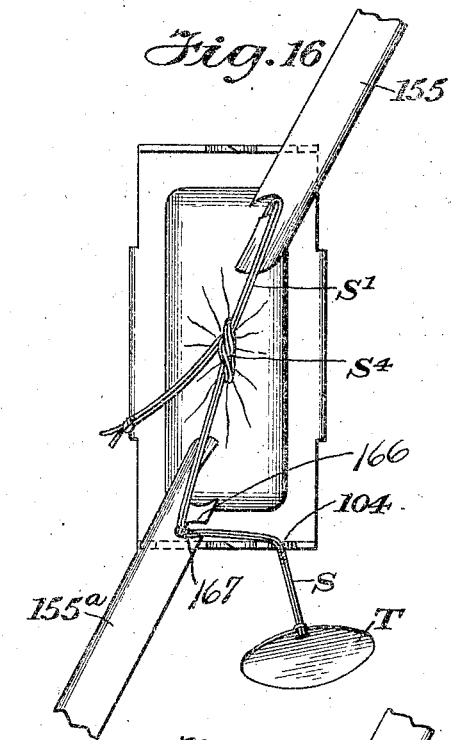
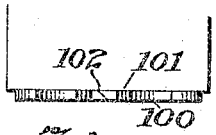
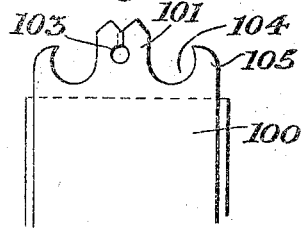
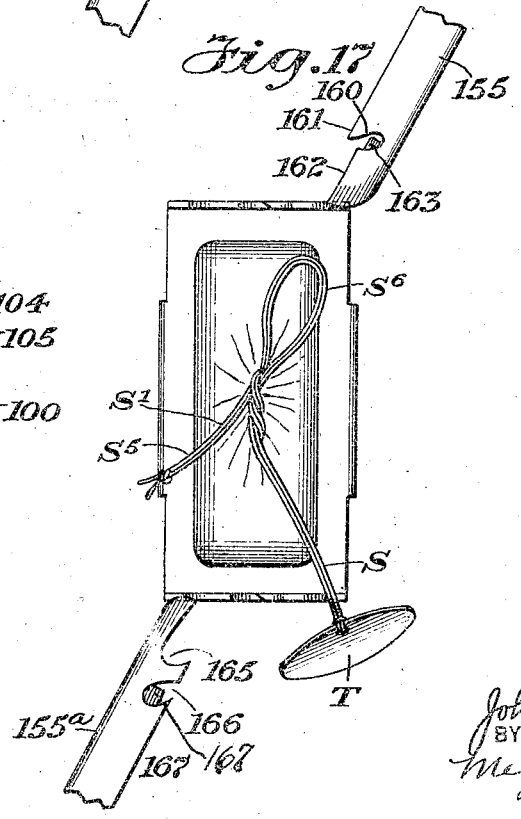
INVENTOR
John T. Dalton
BY
Meyers & Cavanagh
HIS ATTORNEYS

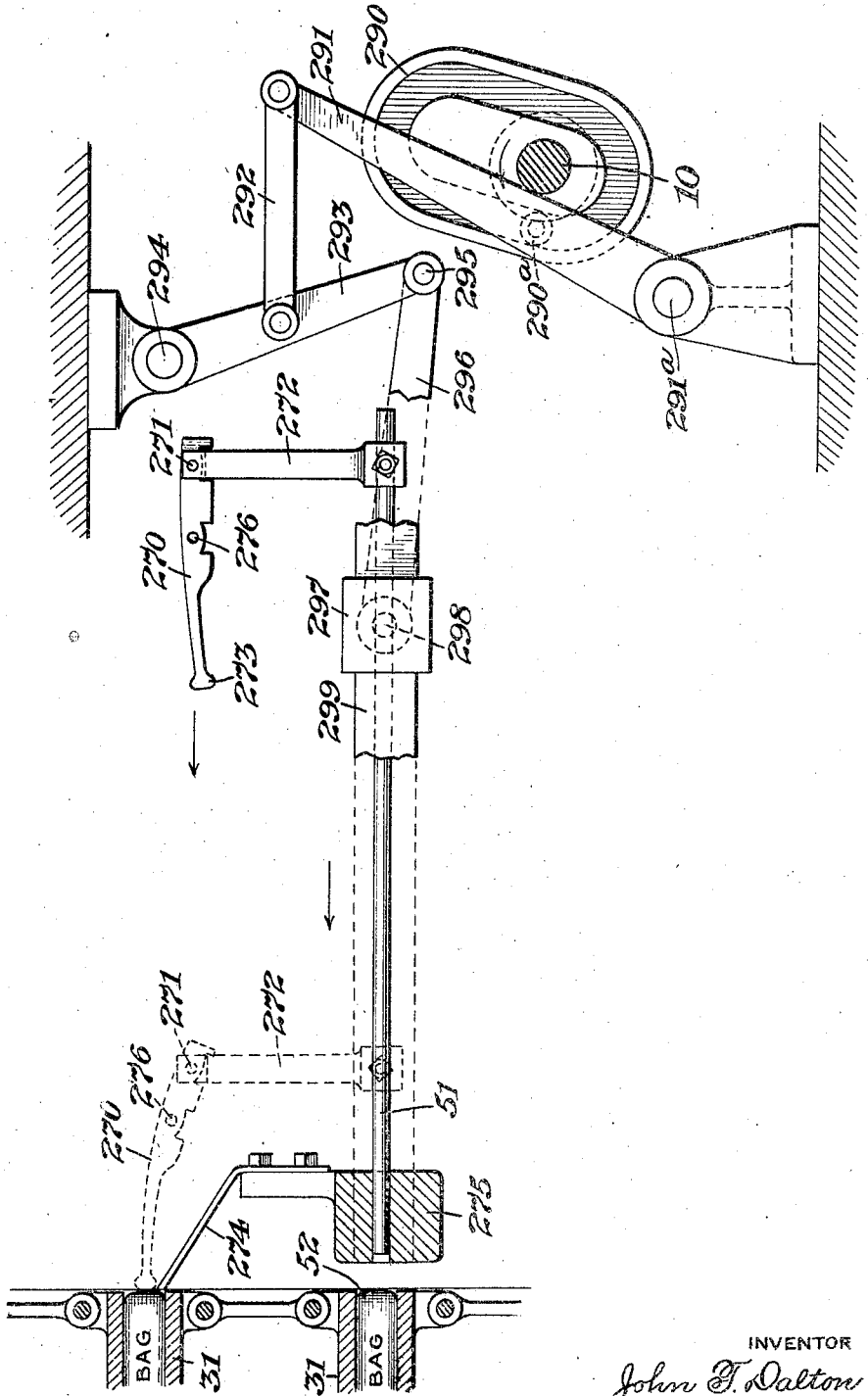

Dec. 9, 1924.

J. T. DALTON 1,518,310

PACKAGING AND TYING MECHANISM

Filed Feb. 16, 1924      13 Sheets-Sheet 13

INVENTOR
John T. Dalton
BY
Meyers & Cavanagh
HIS ATTORNEYS

Patented Dec. 9, 1924.

1,518,310

UNITED STATES PATENT OFFICE.

JOHN T. DALTON, OF DURHAM, NORTH CAROLINA, ASSIGNOR TO THE AMERICAN TOBACCO COMPANY, OF NEW YORK, N. Y., A CORPORATION OF NEW JERSEY.

PACKAGING AND TYING MECHANISM.

Application filed February 16, 1924. Serial No. 693,393.

*To all whom it may concern:*

Be it known that I, JOHN T. DALTON, a citizen of the United States, and resident of Durham, in the county of Durham and State of North Carolina, have invented certain new and useful Improvements in Packaging and Tying Mechanism, of which the following is a specification.

My invention relates to packaging and tying mechanism, and especially to the class of mechanism which is adapted for filling pouches or bags, applying labels or revenue stamps to them, and otherwise preparing them for shipment and sale.

While the invention is not necessarily limited as to its utility, it is especially well adapted to mechanisms designed for filling small cotton bags with smoking tobacco, applying revenue stamps, and when desired also applying and securing a book of "papers" to each bag, bags so prepared being in great demand for pocket use of pipe and cigarette smokers.

Particularly, the invention as herein disclosed is in one aspect a modification of or an addition to a previously well-known machine which automatically inserts measured charges of tobacco in cotton bags, which are placed by hand on spouts of a rotary turret, positioned beneath the filling hopper, filled and transferred to successive bag holders of a conveyor, and carried on to a point where the next operation is performed, which is specifically in this machine the application of a revenue stamp over the mouth end of the bag. In these machines no provision has heretofore been made for tying or otherwise closing the bags, which have (by operations previously performed) draw strings inserted in hem edges surrounding their mouths and which must, of course, remain open with the strings undrawn and untied during the filling operation. The practice in the operation of such machines has been for an attendant to sit astride the bag holder conveyor above mentioned and to grasp the loosely hanging strings and tie them in a suitable knot, usually a double or single bow. Since the machines in question operate at considerable speed, it is necessary for the tier to be dexterous and attentive if he is to avoid "missing" any bags, and even when the tiers are trained and competent, it is sometimes impossible for them to keep up with the bag movement, and tie skips occur, which cause considerable delay and annoyance in connection with other operations of the machine; and, of course, the necessity for the tier greatly increases the labor cost. The particular machines referred to above require the service of an attendant to place the bags on the turret spouts, another attendant to supervise the stamping and other subsequent operations, and a third attendant to do the tying.

My invention provides entirely automatic means for closing and tying the successively advancing filled bags, the invention being designed, so far as the tying mechanism per se is concerned, as exemplified in the present embodiment, for incorporation in or as addition to the known machines above referred to, and completely organized for successful co-operation with such machines. The tying mechanism operates with great accuracy and practically without skips, and in fact the operation of the tying mechanism itself, as demonstrated in daily practice, is practically perfect and skips or bad ties occur practically only when other previous operations have been omitted or badly performed. Considering the invention only as a tying mechanism, therefore, it is entirely dispenses with the expense of a third attendant, and makes the said known machines, or any other mechanism to which the invention is adapted or adaptable, or in which it may be incorporated as a part of a completely organized machine, entirely automatic so far as the bag closing and tying operations are concerned.

The tying mechanism also is capable of operating at high speed, the normal output of the aforesaid known type of bag handling machines being well within the capacity of the tying mechanism; and where other parts of a complete bag filling and handling machine are designed for higher output capacity, the tying mechanism is or can readily be adapted for such increased output, up to any reasonable number of bags per minute.

The invention is adapted or adaptable for making different styles of ties. It can be readily adapted to tie the strings in a hard knot, but since such a tie would be inconvenient to the tobacco user, the machine as here shown is adapted to make a bow knot. It can readily be adapted to tie a double bow, but specifically, in the present example, it is arranged or adapted to tie a single bow, since this is sufficient to enable the consumer to easily untie the bag and particularly because under present conditions, a tag is attached to one of the draw strings, and it is desirable that this string shall be left relatively long after the tying operation, so that the tag may hang at one side of the bag; consequently, the single bow is formed in the other, untagged, string.

The invention also includes means for avoiding delay or inconvenience resulting from skips in the regular advance of bags up to the stamping position, that is, failure to place bags on the turret spouts, or failure for any other reason to properly present bags in regular order for filling and tying. Particularly, as here embodied, the invention consists, so far as this feature is concerned, in a magazine conveniently located posterior to the tying point and anterior to the stamping position. Properly filled and tied bags in any reasonable number are placed in this magazine and means are provided by which, whenever a conveyor bag holder arrives at a certain predetermined position without a bag therein, or with a bag in any considerably defective condition, as for instance, one that is only partly filled, or improperly positioned, a properly filled and tied bag will be ejected from the magazine, and take the place in the regular line of bag advance of the missing or improperly positioned or conditioned bag.

In the above mentioned known machine, glued revenue stamps are presented in regular sequence in front of the advancing bags, and if there is a skip in the regular order of bag advance, a revenue stamp is presented without any bag to receive it and carry it away from the point of presentation. Since skips at more or less frequent intervals are practically unavoidable, considerable attention of an attendant is required to properly dispose of these unused glued revenue stamps, in order to avoid loss of the stamp itself, and to prevent the glued stamp from getting mixed up in the mechanism or applying glue to the machine parts where it would cause trouble, and for other obvious reasons. The provision of a magazine of filled and tied bags, with means for automatically substituting one of these bags for any bag missing in the regular order of operations, avoids the difficulty and annoyance referred to and also enables the attendant who supervises the stamping and subsequent operations to pay closer attention to the operations subsequent to stamping, and to the proper inspection and arrangement of the completed packages.

The characteristics and advantages of the invention are further sufficiently explained in connection with the following detail description of the accompanying drawings, which show one exemplifying embodiment of the invention. After considering this, it will be evident that many variations may be made, and I contemplate the employment of any structures that are properly within the scope of the appended claims.

Fig. 9 is a similar view showing the parts in another position.

Fig. 10 is a detail view in vertical section of the hopper and latch mechanism.

Fig. 11 is a similar view showing the parts in a different position.

Fig. 12 is an elevation of the hopper, latch mechanism and associated or adjacent parts.

Fig. 13 is a detail view in vertical section illustrating mainly string handling or positioning devices.

Figs. 16 and 17 are views similar to Fig. 14, showing progressive stages of the tying operation.

Fig. 18 is an elevation showing mainly mechanism for ejecting the bags from the successively positioned conveyor bag holders, and feeler mechanism co-operating with the bags, the extra bag magazine and the bag ejector.

Figs. 21 and 22 are details in plan and elevation respectively, of string holding or supporting devices.

Figure 1:
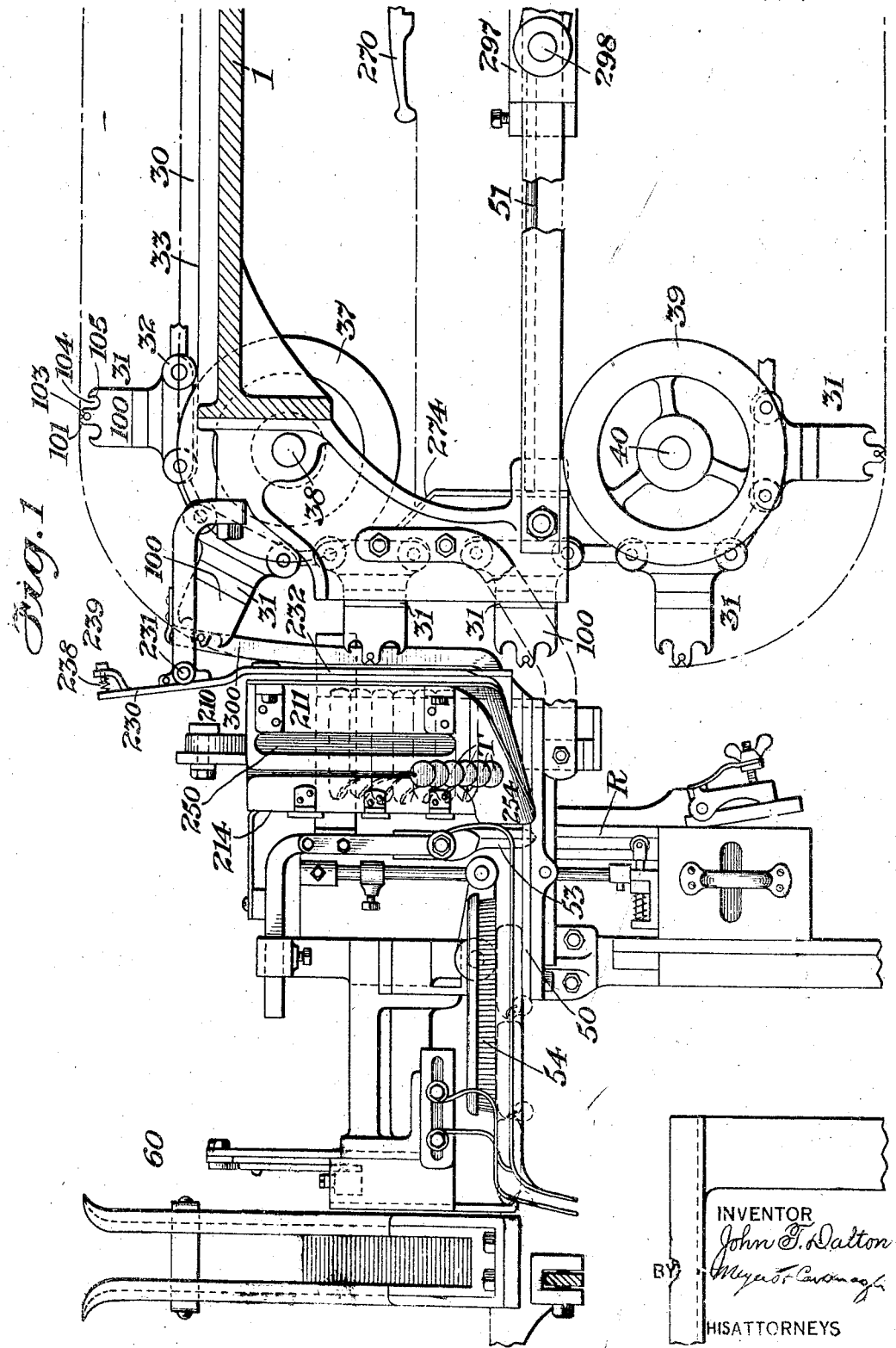
Fig. 1 is a view mainly in side elevation, but partly in section, showing certain parts of a representative bag handling and stamping machine, with my invention incorporated therein.

Figs. 23 to 28 inclusive are detail views of parts of the string holding, supporting or manipulating devices.

The invention in its present embodiment is incorporated in a known machine for filling, stamping and otherwise operating upon cotton tobacco bags of the type referred to hereinabove. This machine, as sufficiently illustrated in the drawings, includes a table 1 carried by supports 2, 3, and a rotary turret or bag carrier 6 supported by a shaft 7 mounted for rotation on the table. The turret is driven intermittently, one-quarter revolution at a time, and it is also raised and lowered at suitable intervals by mechanism not particularly illustrated, since the machine itself, as above stated, has been for some time in use and its construction is well known to persons skilled in the art.

Below the table 1 is a driving shaft 10 connected by gears 11 to another shaft 12. Supported on the rotary turret are four bag spouts 15, each of which has at its upper end a flared mouth 16. Located above the table near one side, is tobacco measuring apparatus (not shown) which at suitable intervals deposits a measured quantity of tobacco in a hopper 18 when one of the spout mouths 16 is located beneath the hopper spout 19. A plunger 20 is arranged to move through the turret bag spout at a point of turret movement 90° beyond the filling position to compress the tobacco charge in the bag. This plunger is carried by a bracket 21 movable in vertical guides on an upright frame member 22. The bracket is operated by a link 23 connected to a lever 24, fulcrumed at 25 and provided with a cam roller 26 running in a cam track 27, in a cam body mounted on shaft 10 or formed in a gear 28 thereon. A chain conveyor comprising parallel chains 30 runs under the turret bag spouts at pressing position. Between the chains at regular intervals are bag holders 31, provided with wheels 32 running on table tracks 33. The bag holders are positioned to receive the filled bags from the turret spouts, the pressing plunger serving to press the charge in the bag located in the conveyor holder, while another bag is being filled at the filling position. The plunger remains down while the turret rises to retain the bag in the conveyor holder and strip it away from the turret spout. Then the plunger rises clear of the bag to permit conveyor movement.

Figure 6:
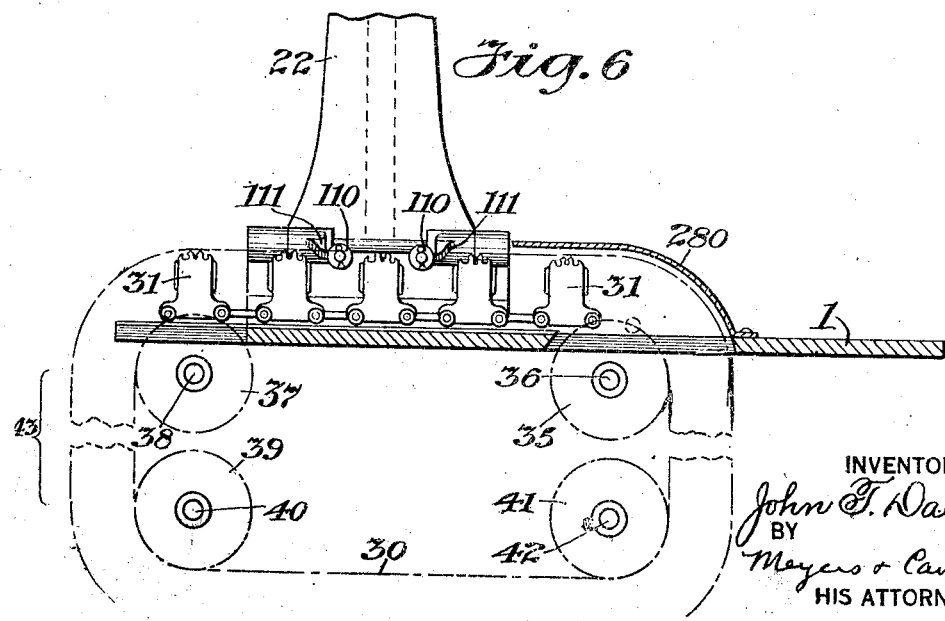
Fig. 6 is a vertical section of the same.
Figure 7:
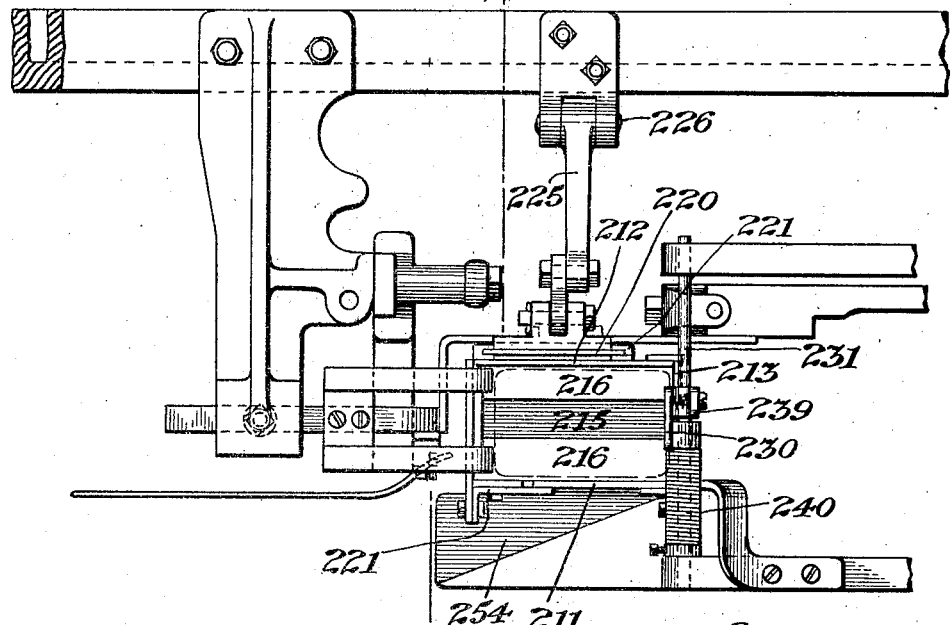
Fig. 7 is a view, mainly in plan, of the extra bag hopper and associated devices.

The chains (as best shown in Fig. 6) pass about sprockets 35 on a shaft 36, sprockets 37 on a shaft 38, sprockets 39 on a shaft 40 and sprockets 41 on a shaft 42, the shafts being arranged so that the conveyor pursues substantially rectangular course, including a downwardly moving stretch 43. The conveyor is intermittently driven in conformity with the turret and plunger movements.

Figure 2:
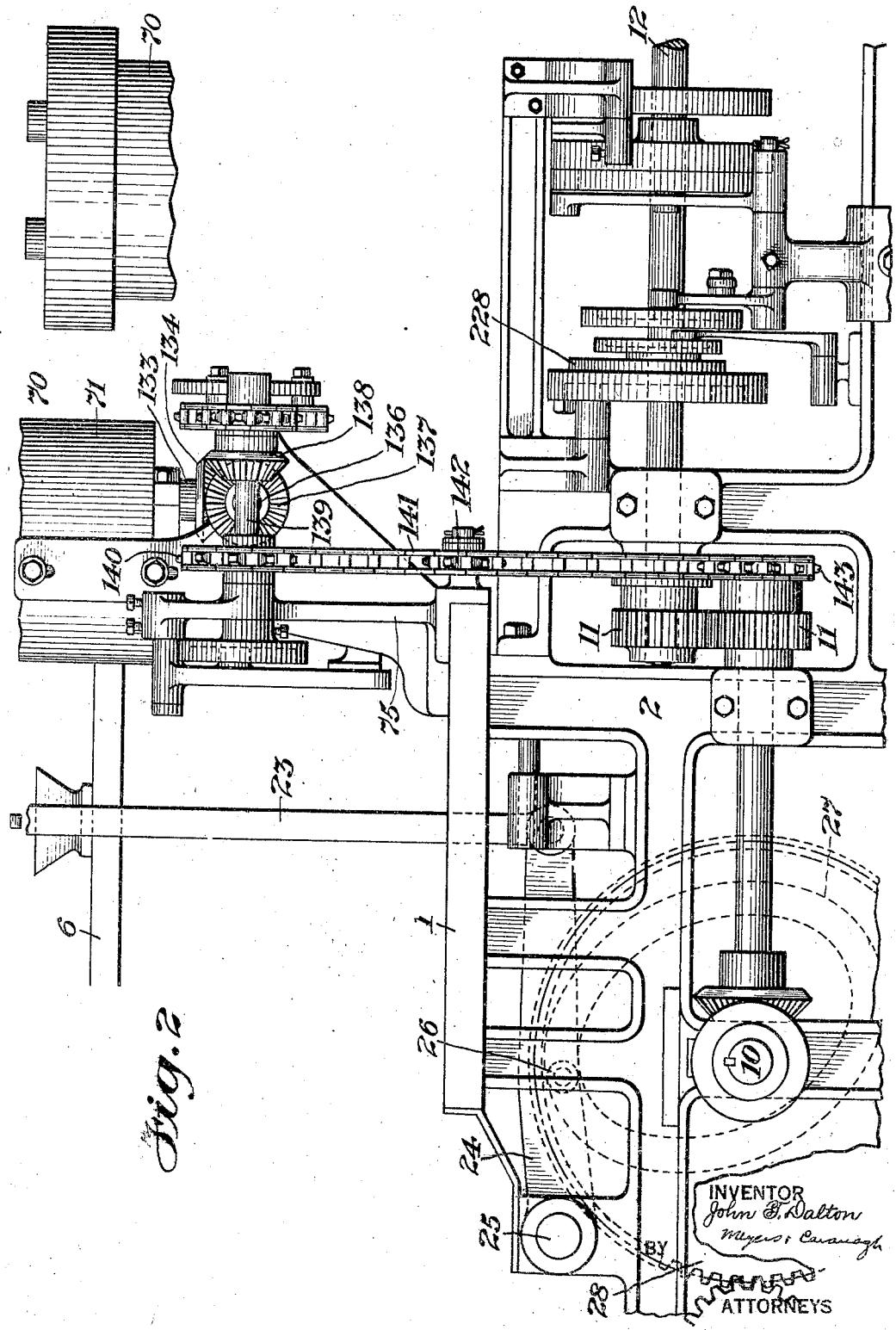
Fig. 2 is an elevation from the opposite side of the machine.

The cotton tobacco bags B are furnished in bunches in flat open mouthed condition and with double draw strings S and $S^1$ inserted in their hemmed mouth edges, the strings being, of course, undrawn but with fairly long ends projecting beyond the bag. An attendant stationed near the turret positions one of the bags on the lower end of each turret spout 15 at some point in the turret movement after it passes the filling position and before it again reaches that position. The attendants acquire great dexterity, so that while the turret makes more than thirty quarter turns per minute, a competent attendant can slip the bags over the spouts and properly position them with relatively few skips or improperly positioned bags. Care is, of course, taken to position the bags with due regard to a desired string arrangement, that is to say, so that the strings of the successive bags will be in the same positions as indicated at the left and right, in Fig. 3, with the exception that the string holding devices there shown, and forming a part of the present invention, are not present in the old machine now being described. Each successive turret spout carrying a filled bag is brought into position over a conveyor bag holder 31, while the turret is in elevated position and the pressing plunger 20 is retracted. The turret then descends, moving its bag down into the holder as or just before a measured charge of tobacco is deposited in the flared spout mouth 16 at the filling station, the turret and conveyor being now at rest. The pressing plunger 20 then descends to compact the charge in the bag; the turret rises while the plunger remains down to retain the bag in the conveyor holder; the plunger is retracted; the turret advances a quarter turn while the conveyor advances one step, and so on. An attendant is seated astride the conveyor just beyond the filling position, or to the right of the turret in Fig. 2, and as each filled bag advances in its holder and before it comes to the downward moving conveyor stretch 43, he must grasp the strings, draw them tight to close the bag mouth, and tie them. The tie may be a double bow or preferably, in many cases, it is a single bow for reasons mentioned above, and again referred to hereafter. The tiers also acquire great dexterity and correctly tie a very high percentage of the bags, but errors or skips in tying, as well as in the placing of the bags on the turret spouts, occur at more or less frequent intervals, as further referred to hereafter.

As the bag holders move down through the vertical conveyor stretch 43, they are successively positioned opposite a horizontal bag channel 50, which may be identified as a stamping channel, and a plunger 51 (Figs. 12 and 18) advances through the aperture 52 in the bottom of the bag holder and ejects the bag and moves it the desired distance through the stamping channel. Prior to the bag movement, a revenue stamp R, Fig. 1, is drawn up by stamp grippers 53 and positioned vertically across the channel in the mid-width position of the bag whose advancing end strikes the middle of the stamp (which has been properly glued) and the stamp ends are folded against the broad sides of the bag and pressed down by suitable devices including the brush 54. The plunger, which may be identified as an ejector plunger in distinction from the compressing plunger 20 above mentioned, is then withdrawn, the conveyor again advances to position another bag opposite the stamp channel, and so on. Other operations may be performed upon the bag, including the association with it of a book of papers, applying a band to retain the papers, and in some cases applying an additional label, these operations being performed at or adjacent to the station 60, Fig. 1.

While, as above stated, the bag placing and tying attendants are usually skilful and efficient within human limits, the tier makes faulty ties or entirely misses a tie at more or less frequent intervals. Since only two seconds or less, is allowed him for each tying operation, he ordinarily does not have time to correct mistakes but must immediately give attention to the next approaching bag. Unless the third attendant mentioned early above is able to detect misties or the tier is able to remove the untied or mistied bag before it reaches stamping position, a stamp will be applied to the faulty bag, resulting either in the waste of a stamp, or particular attention by the third attendant, or someone else, to redeem the stamp, correct the tie and restamp the bag. To largely or entirely eliminate skips or errors in tying and also dispense with the services of the tier, the present invention provides entirely automatic tying mechanism presently described. The bag placer also at more or less frequent intervals fails to place a bag on a turret spout, and in that case, after a stated number of conveyor movements, an empty conveyor holder is presented to the ejector plunger and when the plunger advances no bag is advanced ahead of it, and consequently the revenue stamp which has been positioned for application to the bag may be wasted, or else careful attention is required to redeem the stamp and prevent its getting clogged up in the mechanism or causing other trouble. To do away with this difficulty, the present invention provides entirely automatic means for insuring the proper presentation of a bag for stamping at each advance of the ejector plunger, regardless of whether a bag has been properly supplied to the conveyor holder or not. This and other features of the invention will be described after the description of the tying mechanism.

While the tying mechanism per se may, in the broader aspect of the invention vary greatly, and I do not limit myself to any particular tying mechanism or mode of tying, I conveniently employ tying mechanism which is in general substantially similar to that disclosed in my Patent No. 1,125,666, January 19, 1915, this mechanism being, so far as the knotting operation is concerned, entirely automatic in its action, and being adapted to grasp the strings of successively advancing bags, draw them tight and knot them, and in connection with the tying mechanism in the patent, a bag holder provided with string supports is shown, but the tying mechanism as disclosed in the patent is not associated or correlated with any complete bag handling mechanism or any means for successively presenting the bags to the knotter, or for properly arranging the bag strings in the string supports. Certain modifications and improvements are, however, made in the tying mechanism disclosed in the patent and especially, important additions are provided for the present purposes, as sufficiently explained hereafter.

The tying mechanism, designated in general by reference number 70, is enclosed in a casing 71 and is supported on a supplemental frame comprising uprights 75 and 76 secured to table 1. The tying mechanism is therefore located practically in the position occupied by the human tier in the old machine.

To co-operate with the automatic knotter mechanism, provision is made for properly positioning the bag strings. For this purpose the turret or turret bag spouts are provided with string holders consisting of arms 80, Figs. 3, 13 and 23 to 28 inclusive. These arms are located at opposite narrow sides of the spout corresponding to the narrow vertical sides of the bag and are conveniently secured to a collar 81 secured about the upper part of the spout just below the turret. The main vertical portions of the arms are located outside the corresponding narrow sides of the conveyor bag holder 31 when the bag spout is at filling position. At the lower end of each arm is a string slot 82 flaring outward and downward. Each arm is also slotted centrally parallel to its broad sides and in this slot is located a gripper blade 83, having a rounded gripper face 84. The gripper blade is pivotally mounted by means of a hole 85 on a central portion 86 of a combined pivot and spring 87, which conveniently consists of a suitably bent piece of spring wire. Above the pivot part 86 the wire has a straight portion 88 terminating in a hooked member 89 gripping around one edge of arm 80. Below the pivot portion, the wire has another portion 90 terminating in an elbowed portion 91, and at the end of this is an inturned portion 92 which passes through a hole 93 in the arm, of sufficient size to allow necessary gripper blade movement, and fits closely in a hole 94 in the gripper blade. The spring and other parts are so designed, that after the spring is bent to proper shape it can then be inserted to retain and properly act upon the gripper blade, in the position shown in Figs. 24, 25 and 26. The gripping face 84 of the blade normally bears against the opposite curved face 95 of the string slot.

When the attendant places the bag on the spout, he also inserts the strings in the respective arm slots 82, pushing them up until they are yieldingly held by faces 84 of the gripper blades, the flared slot openings providing for the easy insertion of the strings; and it is demonstrated in daily practice that the attendants can properly place the bags and position the strings, while the machine is run at normal speed, and in fact, the machine speed can be increased considerably owing to the avoidance of difficulties in connection with tying and with skips in bag placing, as above and hereafter further mentioned.

Figure 3:
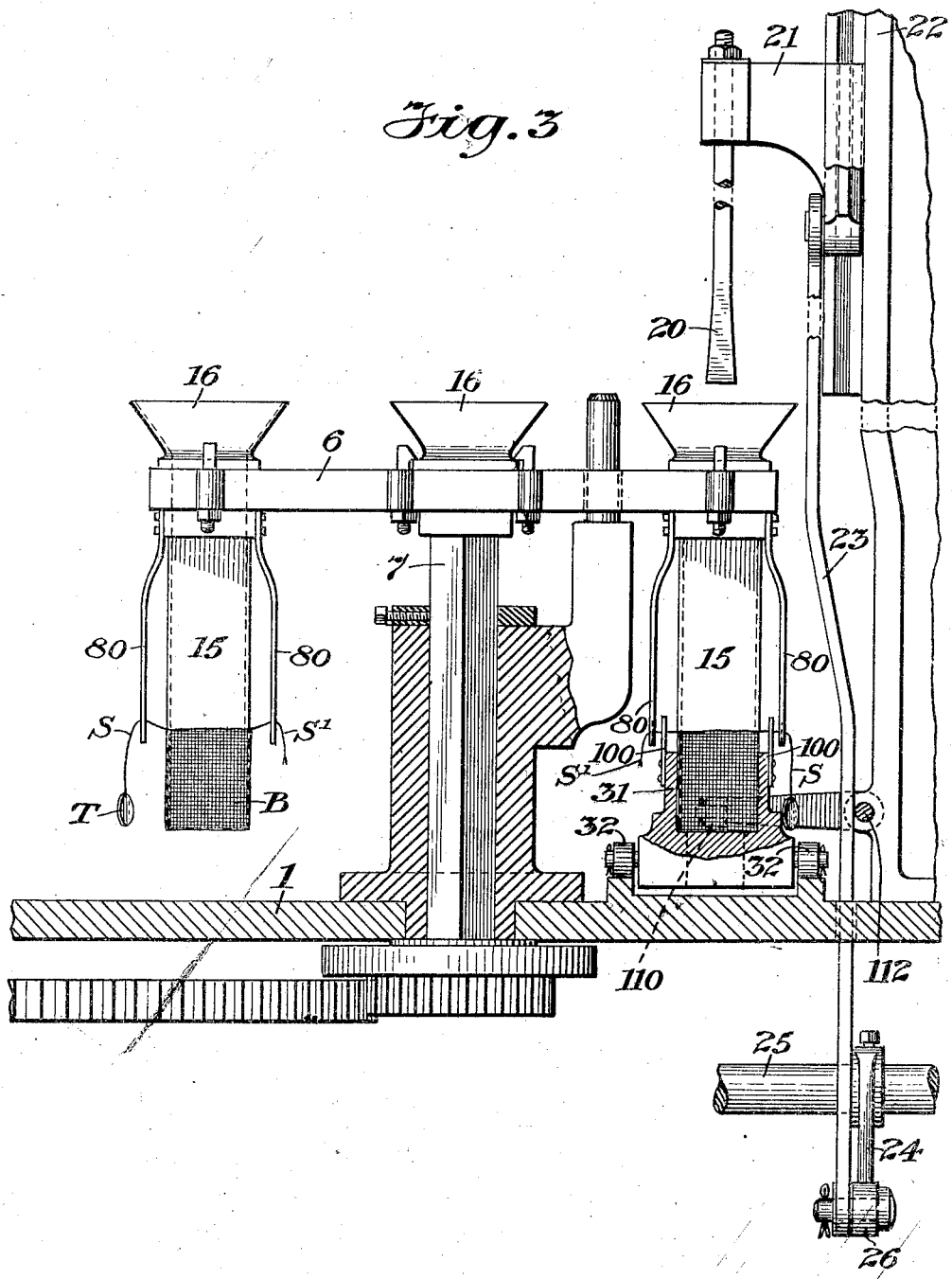
Fig. 3 is a detail view, partly in section, showing mainly the turret, turret bag spouts, conveyor, a conveyor bag holder, and string handling or positioning devices.
Figure 4:
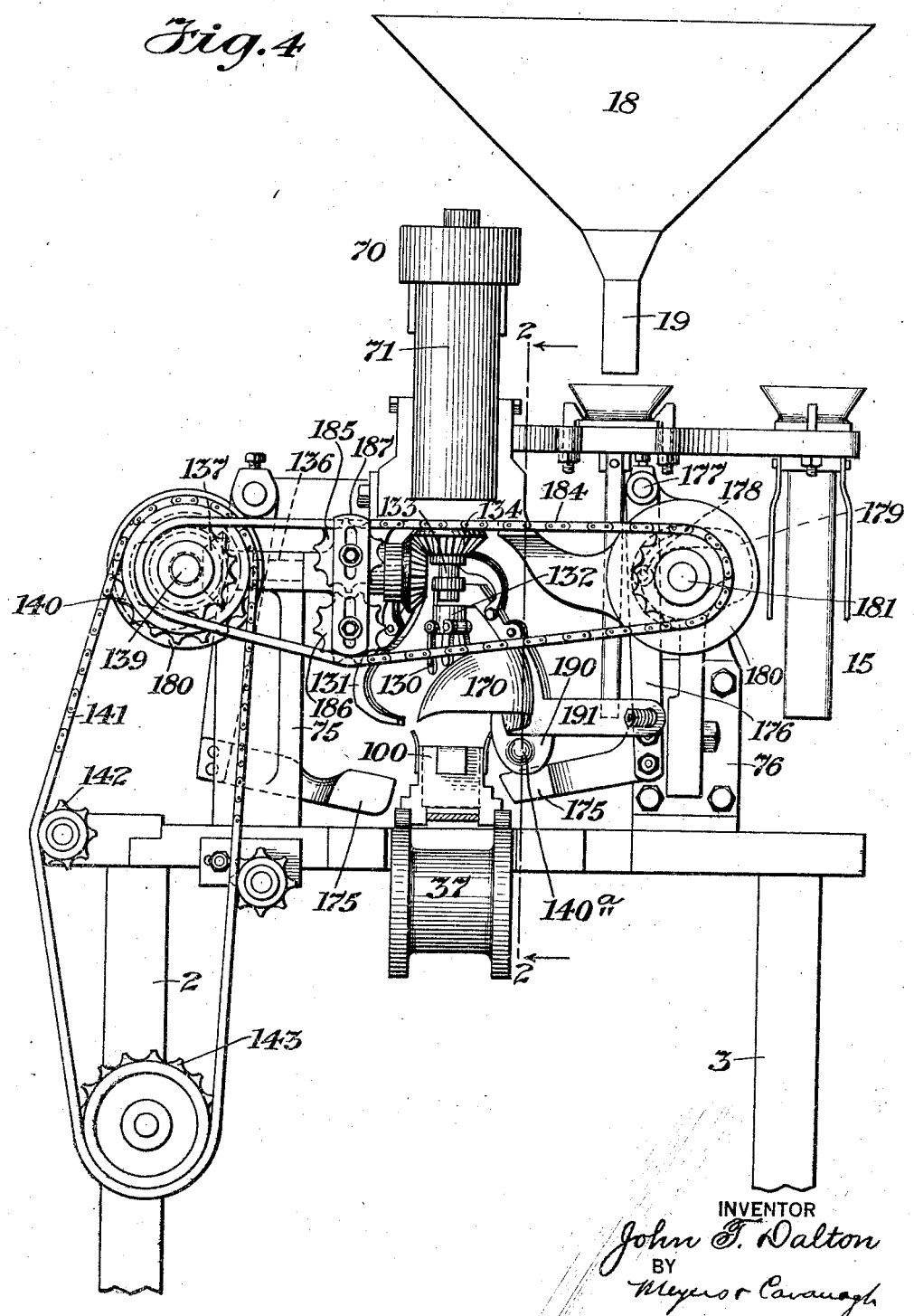
Fig. 4 is a view in elevation showing mainly the tying mechanism.

In many cases a tag T, Fig. 3, is affixed to the end of one of the strings such as S, and the attendant, in accordance with the particular machine arrangement, therefore locates this string outward with relation to the turret center when he places the bag on the spout, and the mechanism is arranged to properly handle the tag or to allow for its presence on the string S, as sufficiently referred to hereafter.

The conveyor bag holders 31 are provided with string holders or supports in the form of plates 100 located opposite the narrow bag sides and spaced therefrom, and also located close to the inner faces of the arms 80 when the turret is in depressed position. Each of the plates has a central upward projection formed with two prongs 101, Figs. 1, 21 and 22, these prongs being separated from each other by a diagonal slot 102 leading to a string hole or eye 103, Fig. 1. At each side of the string eye is a recess or depression 104 defined by a prong or projection 105. These depressions or recesses 104, or certain of them, serve to receive a bag string in certain cases as sufficiently explained below.

Figure 5:
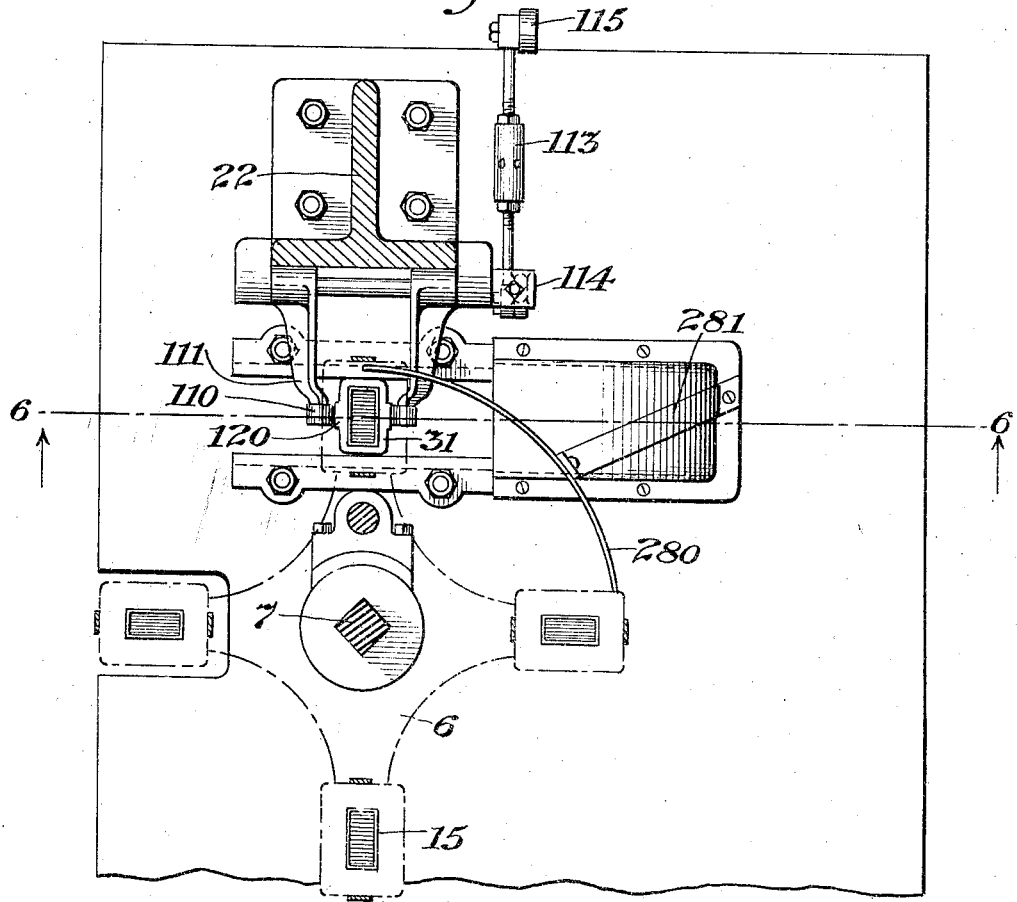
Fig. 5 is a view, principally in plan, showing mainly the parts and operations at the bag filling position.

When a filled bag positioned on a turret spout 15 as above explained is brought over a conveyor bag holder at the pressing and transfer position, the tagged string S is located at the far side of the bag, in the normal viewpoint as the machine is viewed in Fig. 1, or adjacent the hopper supporting frame member 75, Figs. 3 and 5. When the turret is depressed to locate the bag in the holder, the strings are at the same time brought down through the diagonal slots 102 into eyes 103, and when the turret rises, the angularity of the slots causes the strings to be retained in the eyes and pulled away from the yielding grippers in arms 80. The strings of each successive bag are therefore properly located in horizontal position, extending from the bag mouth to each of the string supporting plates 100, so that the string grasping and manipulating devices of the tying mechanism can properly grasp the horizontal string portions.

Desirably each bag holder is definitely located at the pressing and transfer position by rollers 110 carried by arms 111, connected to move together by a shaft 112 and raised and lowered at proper intervals by a link 113 connecting an arm 114 on shaft 112 to any suitable actuating element, such as a lever 115, forming a part of the old machine. When the bag holder moves into position, as shown in Fig. 5, the arms with their rollers are elevated clear of the holder, and the arms are then depressed bringing the rollers in contact with opposite holder faces 120 and thus properly centering or locating the same with relation to the descending turret spout and the pressing plunger 20.

The tying mechanism 70 includes string gripping and manipulating members 130 which may be conveniently designated as a whole, as "tiers", and elbowed members 131 designated as a whole as loopers, mainly as a convenient distinction from the tiers, although the loopers have string gripping and tying functions. The tiers are pivotally mounted on a sleeve which forms a part of a system of concentric shafts 132 extending upward in casing 71 and mounted in suitable bearings for rotary or vertical movement. A parallel vertical shaft 133 is connected at its upper end by gears to the central shaft of the shaft system 132, and various cam tracks in a cam body on shaft 133 control the various tying functions, all substantially as fully disclosed in my above mentioned Patent No. 1,125,666, to which reference should be made for the details of the tying mechanism not here described. The mechanism 70 is driven as a unit by a bevel gear 134 on shaft 133, engaging a similar gear 135 on a horizontal shaft 136 rotating in a bearing sleeve in the tyer mechanism frame above referred to. On shaft 136 is also a bevel gear 137 engaging a similar gear 138 on a longitudinal shaft 139, which is driven from a moving part of the main or old machine, specifically in the present instance, by a sprocket on shaft 139, a chain 141 properly tensioned by an idler 142 and a sprocket 143 on shaft 12 previously mentioned, which serves in the old machine to drive the stamping and other mechanism. The tying mechanism is therefore driven automatically in connection with the known machine, to make one full cycle of operations, commencing at or just after the presentation of each bag below the knotting mechanism and terminating with release of the bag strings as, or just before, the bag is carried on.

The tiers 130 include string grippers 150, formed in connection with notches or jaws at symmetrically similar sides of the lower ends of the tier arms. These tier arms can be swung on their pivots so that their lower ends converge and diverge, they are raised and lowered bodily by movement of their pivot mounting, and the grippers are operated to grasp and release the strings, all substantially as explained in the patent. The loopers include horizontal string manipulating portions, or loopers proper, 155, and for a certain kind of knot, namely a double bow, as shown in the patent, the loopers may be substantially similar or identical in construction. Since in the present specific mechanism provision is made for tying a single bow, the construction of the loopers, or particularly one of them, differs substantially from the showing of the patent and therefore, the loopers and particularly their grippers and adjacent portions will be particularly described shortly below. As a whole the loopers 131 have only a single movement, that is a convergent and divergent movement on their pivots to bring the looper arms 155 close together side by side and over the bag, or to take them clear of the bags, substantially as disclosed in the patent.

In general conformity with the patent one of the looper arms 155 has near its free end, at one side, a string notch 160, one face of which terminates in a prong or point 161 extending laterally beyond an outward flat vertical face 162. A movable string gripper 163 serves to clamp the string against one face of the notch 160. In distinction from the structure or arrangement shown in the patent, the other looper 155ª has at one side of its free end a string depression or notch 165, and shortly inward therefrom, and at the same side of the arm, is another string notch 166 which may be called a "gripper" notch, provided with a movable gripper 167 to clamp a string against one of the notch faces. Although it is not necessary in all cases, in some cases, as here shown, a guard 170, which may be identified as a tag guard, is affixed to one of the looper arms 131. The guard is in general part-circular, and is designed to be engaged by the tag T or the tagged string, as the tag and string rotate during tying action, and to prevent the tag from flying out and striking the looper arm, or other interference with the proper string and tag movement during tying. Where the looper arm is especially designed to give ample clearance for tag movement, the guard 170 may be omitted.

To provide for or to assist in releasing the strings from the tier grippers, blades or string pushers 175 are provided, arranged to advance and push or release the strings from the string jaws 150 in tiers 130 at about the time that the grippers open to free the strings. These blades are carried by vertical arms 176 pivoted at 177 on the tier frame and provided with cam rollers 178 engaging cam grooves 179 in cam bodies 180. One of these cam bodies is mounted on shaft 139 previously mentioned, and the other is mounted on an opposite parallel shaft 181, supported by the tier frame upright 76 and driven by sprockets and a chain 184 from shaft 139. The chain is suitably guided or tensioned by adjustable idlers 185 and 186 mounted in a slotted bracket 187.

Another guard member 190 is desirably provided, connected to one of the blade supporting arms 176 by an arm 191. The guard 190 is positioned in front of the tag as it is swung around in the tying movement above referred to, so that instead of being permitted to fly around ahead of the bag the tag strikes this guard or baffle and is caused to bounce back and lie properly in a suitable position alongside the bag during the further bag advance, as sufficiently referred to hereafter.

Figure 14:
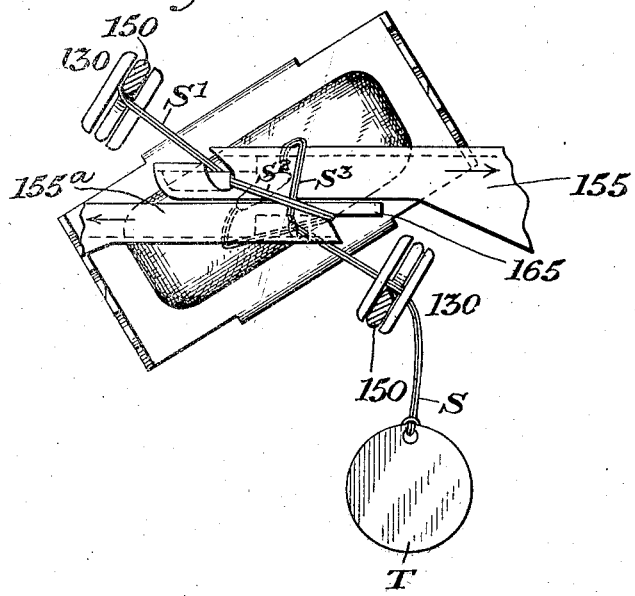
Fig. 14 is a view in horizontal section, looking down on a bag in process of tying.
Figure 15:
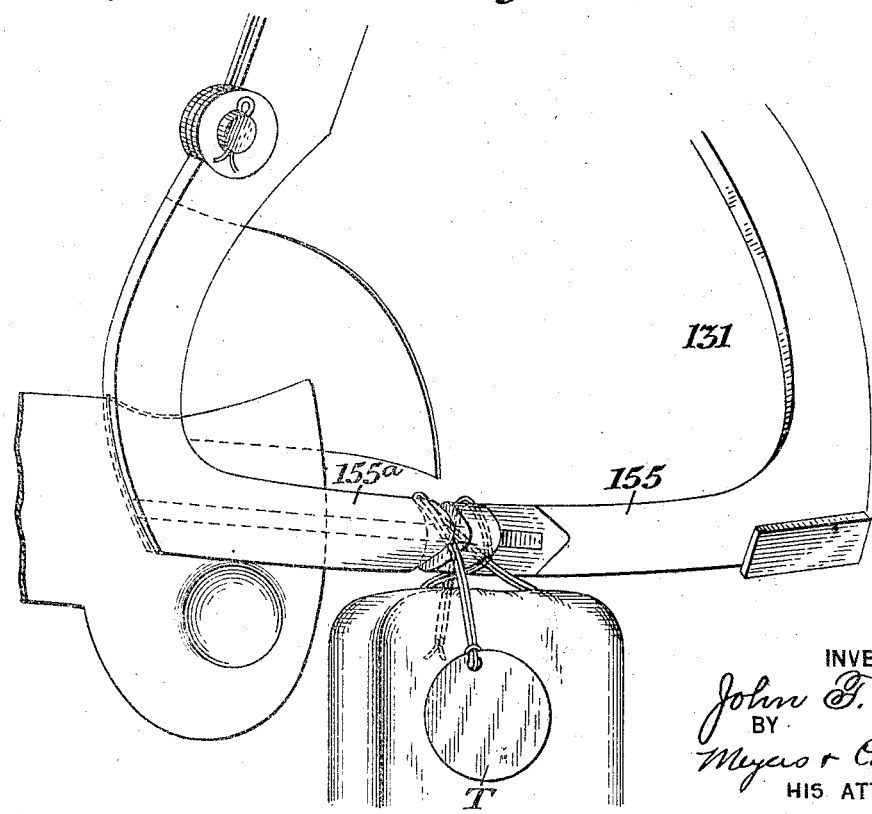
Fig. 15 is an enlarged detail elevation of a part of the tying mechanism.

When the bag comes into position directly under the tying mechanism 70, the tiers 130 are in depressed position and are then rotated so that the horizontal string portions between the bag and the supports 100 pass into the tier jaws and are gripped therein, and as the tiers then move upward with continued rotation, the strings are withdrawn from their supports, passing out through the diagonal slots 102. The tiers then move divergently so that the strings are "drawn" and the bag mouth is closed. Meantime the looper arms or bills 155ª have been moved convergently so that their active portions lie side by side over the bag top, as in Fig. 15. Before the tiers 130 have rotated far enough to strike the loopers they have been elevated sufficiently to clear them, and in the further rotation of the tiers, the strings are wrapped around the loopers and located at the end of the active tier movement as shown in Fig. 14. String S is carried around both of the loopers and string S¹ is also carried around the loopers with a portion s² located over a portion s³ of string S. Just after the tiers pass over the loopers before they reach the position shown in Fig. 14, they are moved downward as they continue to rotate and in this downward movement a portion of string S is brought into the gripper notch of looper 155$^a$, and a portion of string S$^1$ is brought into the gripper notch of looper 155, and thereupon the strings are gripped by the advancing movement of the looper grippers. The string holding notch 165 of looper 155$^a$ is located so that in the winding movement of string S$^1$ it is brought into the notch. This provision or arrangement is for the purpose of forming only a single bow since string S$^1$ is thus located so that the portion of it gripped by looper 155 will be drawn through the loop $s^3$ of string S, while the portion of string S gripped by looper 155$^a$ is "outside" the string loops and cannot be drawn through a loop when the looper is retracted. At about the position of Fig. 14, the tier grippers are retracted and the strings are pushed out of the tier jaws by blades 175 as above sufficiently explained.

The loopers are then retracted, as shown in Fig. 16, and in this movement the string S$^1$ engaged by looper 155, is drawn through the loops $s^3$ and both strings are pulled tight, forming the bow knot $s^4$ which, in the drawing, is shown relatively loose for illustrative purposes. Prior to the cycle moment indicated in Fig. 16, string S has been located in one of the string notches 104 by the action of the tag guards above referred to, so that the tag will hang properly adjacent to one narrow side of the bag. A portion or "end" $s^5$ of string S$^1$ is left projecting from the knot, so that by pulling it the bight or bow $s^6$ can be drawn through the knot to free the strings when it is desired to open the bag.

At about the point indicated in Fig. 16, the looper string grippers are retracted to free the strings and the loopers are then retracted further to normal or clear position, as shown in Fig. 17. The bag conveyor then moves on to carry away the tied bag and position the next one for tying.

Figure 20:
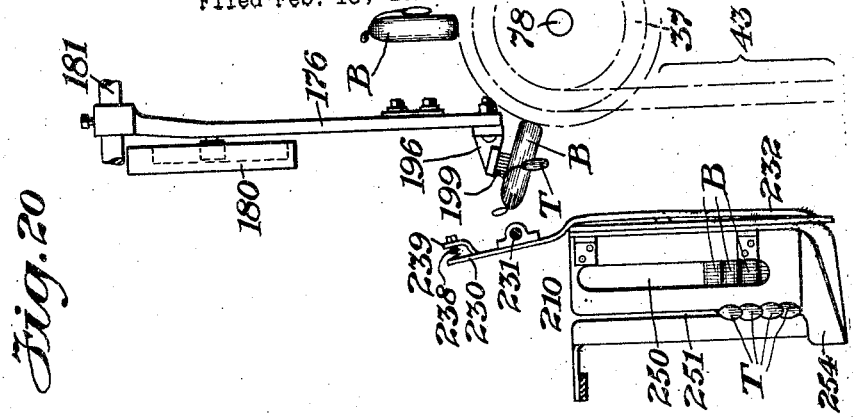
Figs. 19 and 20 are detail views in elevation of features of the tying mechanism which may be incorporated in the machine, as shown in other figures, or which may be used as a modified arrangement when desired.
Figure 19:
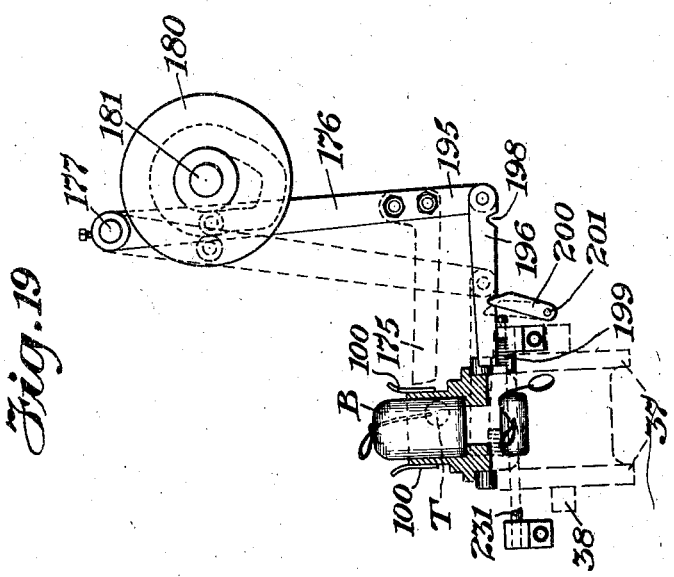

To provide for properly positioning the tag or tagged string, as an alternative to the method or devices above referred to, means may be provided as shown in Figs. 19 and 20, associated with one of the string releasing blades 175 and its supporting arm 176. For this purpose arm 176 has a downward extension 195 to which a brush arm 196 is pivotally connected. The arm is provided with camlike notches 197 and 198. A tag brush 199 is secured at the lower side of the free end of the arm. To co-operate with the notches a pawl 200 is pivotally mounted at 201 on a stationary support. The brush acts on a bag which has been brought nearly to horizontal position at the upper end of the vertical conveyor stretch 43, Fig. 20. At this time the tag, if it has not been properly acted upon by the tag guards or other devices above mentioned, or if such devices are not provided, may be lying on top of the bag. When lever 176 is moved to the left, as viewed in Fig. 19, for the string releasing function of blade 175, the end of pawl 200 engages in notch 197 of arm 196, and lifts the arm so that the brush is raised clear of the tag, and at the end of the lever movement the end of the pawl enters notch 198, permitting the brush arm to drop, bringing the brush in contact with the upper bag surface. When lever 176 is retracted (to the right in Fig. 19), the pawl moves to the right without lifting the brush arm, and the brush drags across the bag surface and pulls the tag to the right and causes it to drop clear of the bag at one of the narrow sides therefor, in proper position for subsequent operations. This device obviously may be employed in connection with the other tag controlling or handling devices to provide for failure or imperfect operations thereof, or may be used in substitution for them, as above stated.

Figure 8:
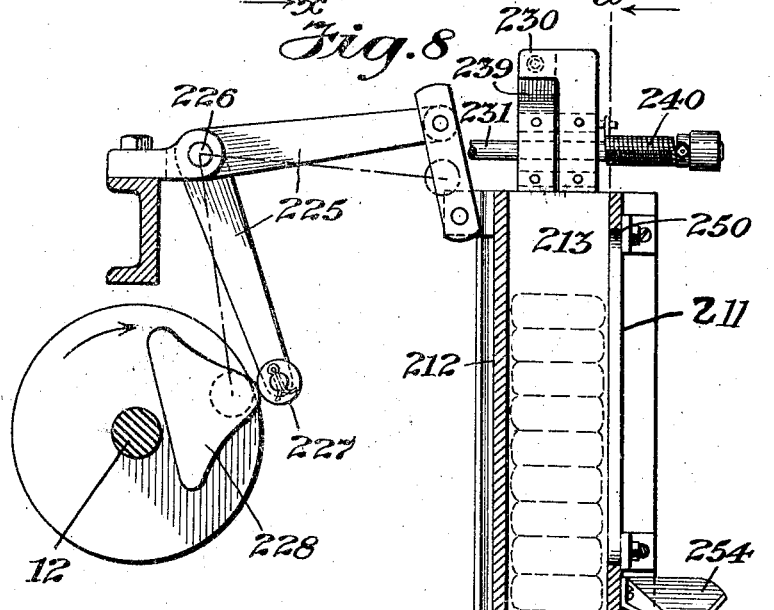
Fig. 8 is a vertical section of the same.

Adjacent to the vertical descending stretch of the conveyor, in a position available without any drastic reorganization of the old machine, is placed a bag magazine 210 comprising side plates 211 and 212, and end plates 213 and 214, and a bottom plate 215. Above the bottom plate are flanges 216 forming a bag support and the bottom plate has side ledges 217 leaving between them and the flanges 216 a space or channel 218, Fig. 8, which is normally in line with the main bag channel or stamping channel above referred to. The magazine as a whole is mounted for vertical movement on a fixed guide plate 220, the edges of which engage in gibs 221 fixed to magazine plate 220, and in every cycle of the machine the magazine is or tends to be raised to normal or upward position by suitable means, including a bell crank lever 225 fulcrumed at 226 on a fixed frame member, and provided with a cam roller 227 to cooperate with a cam 228 on shaft 12.

Latch mechanism is provided to cooperate with the magazine, including a main arm or plate 230 pivotally mounted on a shaft 231 and having a long downwardly extending portion 232 which acts substantially as a cam in cooperation with an advancing bag as later explained. Pivotally mounted in relation to the main latch member is a latch arm proper 235, which is conveniently also mounted on shaft 231. Near the lower end of the latch arm is a shoulder or hook 236, constituting the latch which cooperates with a shoulder 237 on the magazine, and secured to or formed on the magazine end plate 213. The latch is urged in the active direction by a spring 238 compressed between a suitably formed upper latch portion 239 and the main latch arm or plate 230. The latch mechanism as a whole is urged to a retracted or inactive position by a spring 240 coiled about shaft 231 and secured to the main latch plate. The active faces of latch 236 and shoulder 237 are slightly undercut or hooked so that the latch will be retained in engagement with the shoulder to support the magazine whenever the magazine is otherwise unsupported, but when the magazine is raised as hereafter described, the latch will be retracted by the action of spring 240.

Any suitable or convenient number of properly filled and tied but unstamped bags B, are arranged in a stack in the magazine, and a sight opening 250 is desirably provided in plate 211, so that an attendant can note the condition of the bag stack and replenish it at intervals. The lowest bag in the stack rests on the flanges 216. The tagged strings are accommodated by a vertical string slot 251 in plate 211, having at its lower end a forwardly curved portion 252 to permit the string to pass out of the slot when a bag is ejected. The tags hang at the ends of their strings outside and close to the plate 211. Near the lower end of the magazine, a tag guard or guide 254 is arranged to properly receive and direct the lowermost tags.

To properly support and guide the tagged strings of bags presented in the normal way by the conveyor, a guide plate 260 is arranged in any convenient way, for instance, by securing it to a fixed part of the machine frame, or lower end of the bag magazine. This plate has a curved or depressed edge surface 261 to receive the tagged string and properly locate the tag of a bag in position for ejection from the conveyor bag holder by plunger 51.

As the conveyor bag holders 31 move down the vertical conveyor stretch 43 (Fig. 12), whenever a properly filled bag is present in the holder before it reaches the discharge position (the position of the lowermost holder shown in Fig. 12), the mouth end of the bag wipes against the adjacent face of the main latch extension 232 and holds the latch mechanism in active position so that, the magazine being moved upward if it has been previously depressed, or in any case urged or moved slightly upward by the linkage and cam 228, latch shoulder 236 is retained in active position below magazine shoulder 237, and when the magazine is permitted to move downward the shoulder and the hook engage and the magazine is retained in a normal upward position with its channel 218 in line with the main stamping channel. The hook is retained in engagement with the magazine shoulder after the bag has passed below the end of arm 232, by the weight of the magazine and the consequent friction on the hook and shoulder faces, aided when necessary or desirable, by the slight undercutting of these faces previously referred to. When the bag in question is brought to discharge position therefore, it is in line with the clear stamping channel including the channel section provided in the magazine, and plunger 51 advances and moves the bag on through the channel for stamping and subsequent operations in the normal way. If, however, a bag is absent from the holder as it moves adjacent to latch controlling member 232, or if the bag is improperly filled or positioned, spring 240 retracts the latch mechanism so that latch shoulder 236 is free from the magazine shoulder 237, and when the crest of cam 228 passes away from roller 227, the magazine drops by gravity and positions its lowermost bag in line with the stamping channel. When the empty holder reaches discharge position the plunger 51 advances through it and encounters the lowest bag in the magazine and advances that bag for stamping in lieu of the one which should have been presented by the conveyor. Skips or errors in conveyor bag presentation are therefore automatically provided for and a properly filled and tied bag is presented at every plunger advance and there is no waste of stamps or annoyance in connection with the presentation of stamps for which no bag is supplied, as sufficiently explained above.

Whenever the magazine is dropped to supply a bag, it is again lifted by the cam linkage, and if the next holder contains a bag will be retained in elevated position by the latch mechanism, or if the next or any subsequent holder is empty, the latch mechanism will be retracted and the magazine will be dropped to supply a bag in entirely automatic fashion.

To further insure the proper positioning of the bags or especially their proper cooperation with the latch mechanism, a pusher 270 is provided in the form of a lever pivoted at 271 on an arm 272 secured to and extending upward from the ejector plunger 51. To avoid interference with parts of the existing machine, the ejector is, when the plunger is retracted, in a depressed or horizontal position, as shown in solid lines in Fig. 18, and as it approaches the conveyor the free end 273 of the ejector is raised by a cam plate 274 secured to a fixed support, which in the present case is a part of one of the plunger guides 275. The ejector is thus directed into contact with the bottom end of the bag which is in position to cooperate with the latch mechanism, and presses the bag with moderate force into engagement with latch plate 232 to insure the proper action of the latch, and also to properly position the bag before it reaches discharge position. Of course, if the bag holder at the point indicated is empty, the plunger action is ineffective. By providing two pivot holes 276 in the ejector, provision may easily be made for different bag lengths, and for the variable mounting of the ejector for other reasons.

Various additional features or devices may be provided as necessary in special cases. Usually a tag or tagged-string guard 280 is provided in conjunction with or adjacent to the turret, this being in the form of a curved quadrant plate carried by a supporting bracket 281, and arranged to engage the tagged strings of the bag as they advance toward filling position and prevent the strings and tags from flying outward. This may be dispensed with in some cases. Along the vertical stretch of the conveyor the tagged strings S are brought into co-operation with the edge of a substantially vertical guide strip 300 which prevents the tags swinging inward and getting in the way of the ejector plunger or other mechanism; and this strip is also arranged to direct or aid in directing the strings to their location in depression 261 of plate 260, as shown in Fig. 12, in which the guide strip 300 is omitted in order to show other features. The ejector plunger 51 is moved to and fro at the proper times by a link 296 connected to a slide 297 running on a fixed guide 299, the other end of the link being connected to a lever 293 fulcrumed at 294 and connected by a link 292 to a lever 291, which is fulcrumed at 291ª and provided with a cam roller 290ª engaging a cam track in a cam body 290, secured to shaft 10, which is one of the main drive shafts of the old machine. Other additional features, or variations, will be evident to skilled persons in view of the present disclosure.

What I claim is:—

1. Bag handling mechanism comprising means for advancing successive bags with strings supported for co-operation with tying mechanism, and means for automatic-tying mechanism, and means for automatically tying the strings of the successive bags, means for advancing successive filled bags with strings horizontally supported for co-operation with tying mechanism, and means for automatically tying the strings of the successive bags.

2. Bag handling mechanism comprising means for advancing successive filled bags with strings supported for co-operation with tying mechanism, and means for automatically grasping, drawing and tying the strings of the successive bags.

4. Bag handling mechanism comprising means for advancing successive bags with strings supported for co-operation with tying mechanism, and means for automatically grasping and drawing the strings of the successive bags to close the bag mouths and tying the strings in a single-bow knot.

5. Bag handling mechanism comprising means for advancing successive bags with strings supported for co-operation with tying mechanism, and means for automatically tying the strings of the successive bags, means for advancing the bags beyond the tying position, means for stamping the successive bags, and means for automatically supplying a tied bag in the place of a bag which is missing in the regular order of bag advance.

6. Bag handling mechanism comprising means for advancing successive bags with strings supported for cooperation with tying mechanism, means for automatically tying the strings of the successive bags, means for advancing the bags beyond the tying position, means for stamping the successive bags, and means anterior to stamping position for automatically supplying a tied bag in the place of a bag which is missing in the regular order of bag advance.

7. Bag handling mechanism comprising means for advancing successive bags with strings supported for cooperation with tying mechanism, means for automatically tying the strings of the successive bags, means for advancing the bags beyond the tying position, means for stamping the successive bags, a magazine for a number of filled and tied bags, and means for automatically supplying a bag from the magazine in the place of a bag which is missing in the regular order of bag advance.

8. Bag handling mechanism comprising means for advancing successive bags with strings supported for cooperation with tying mechanism, means for automatically tying the strings of the successive bags, means for advancing the bags beyond the tying position, means for stamping the successive bags, a magazine anterior to the stamping position and arranged to hold a stack of filled and tied bags, and means for automatically supplying a bag from the magazine in place of any bag which is missing in the regular order of bag advance.

9. Bag handling mechanism comprising means for advancing successive bags with strings supported for cooperation with tying mechanism, means for automatically tying the strings of the successive bags, means for advancing the bags beyond the tying position, means for stamping the successive bags, a magazine arranged to contain a stack of filled and tied bags, means for moving the magazine to position a bag therein in the line of bag advance, and means regulated by presence or absence of a bag in the regular order of bag advance anterior to the magazine to control the positioning of the magazine so that the bag is supplied from the magazine in place of any bag missing in the regular order.

10. A bag handling machine comprising a spout on which a strung bag is positioned for filling, means for advancing the spout, a bag holder in which the bag is inserted, and string supports associated with the spout and in which the strings are located while the bag is on the spout, string supports associated with the bag holder, the parts being arranged so that the strings are automatically transferred from the spout string supports to the holder string supports and positioned therein for co-operation with subsequently-acting tying mechanism.

11. A bag handling machine comprising a spout on which a strung bag is positioned for filling, means for advancing the spout to filling position, a bag holder in which the bag is inserted at filling position, string supports associated with the spout and in which the strings are located while the bag is on the spout, string supports associated with bag holder, and means for automatically transferring the strings from the spout string supports to the holder string supports and positioned therein for cooperation with subsequently-acting tying mechanism.

12. A bag handling machine comprising a series of spouts on which strung bags are positioned for filling, means for advancing the spouts to filling position, a series of bag holders in which the bags are inserted at filling position, string supports associated with the spouts, string supports associated with the bag holders, and means including arrangement of the parts whereby the strings are automatically transferred from the spout string supports to the holder string supports and positioned therein for cooperation with subsequently-acting tying mechanism.

13. Bag handling mechanism comprising a series of bag spouts, means for moving the spouts to position them successively at a filling point, bag string supports for each spout arranged to support in substantially horizontal position portions of strings extending from opposite sides of the mouth of a bag positioned on the spout, a bag conveyor, a series of bag holders thereon, means for moving the spouts and the conveyor to insert each successive bag in one of the conveyor bag holders, string supports for each bag holder arranged to receive and horizontally support the string portions above mentioned, and means including arrangement of the parts to automatically transfer the strings from the spout string supports to the bag holder string supports.

14. Bag handling mechanism of the class described, comprising a rotary turret, spaced bag spouts thereon, string supports for each spout, a bag conveyor, spaced bag holders thereon, string supports for each holder, means for advancing the turret and conveyor concurrently and intermittently to associate a spout with each holder at a filling station and means for moving the holder to insert a bag carried by a spout in the corresponding holder, the respective string supports being constructed and arranged to effect automatic transfer of strings from the spout supports to the holder supports.

15. A bag handling machine comprising a spout on which a strung bag is positioned for filling, means for advancing the spout, a bag holder in which the bag is inserted, and string supports associated with the spout and in which the strings are located while the bag is on the spout, string supports associated with the bag holder, the parts being arranged so that the strings are automatically transferred from the spout string supports to the holder string supports, and tying mechanism arranged to grasp the strings of the successive bags and draw and tie the strings.

16. A bag handling machine comprising a spout on which a strung bag is positioned for filling, means for advancing the spout, a bag holder in which the bag is inserted, and string supports associated with the spout and in which the strings are located while the bag is on the spout, string supports associated with the bag holder, the parts being arranged so that the strings are automatically transferred from the spout string supports to the holder string supports, and tying mechanism arranged to grasp the strings of the successive bags at a point beyond the filling station and draw and tie the strings in a bow knot.

17. Bag handling mechanism of the class described, comprising a rotary turret, spaced bag spouts thereon, string supports for each spout, a bag conveyor, spaced bag holders thereon, string supports for each holder, means for advancing the turret and conveyor concurrently and intermittently to associate a spout with each holder at a filling station, means for moving the holder to insert a bag carried by a spout in the corresponding holder, the respective string supports being constructed and arranged to effect automatic transfer of strings from the spout supports to the holder supports, and tying mechanism arranged to grasp the strings of the successive bags at a point beyond the filling station and draw and tie the strings.

18. A bag handling machine comprising a spout on which a strung bag is positioned for filling, means for advancing the spout, a bag holder in which the bag is inserted, string supports associated with the spout and in which the strings are located while the bag is on the spout, string supports associated with the bag holder, the parts being arranged so that the strings are automatically transferred from the spout string supports to the holder string supports and positioned therein for cooperation with subsequently-acting tying mechanism, and tying mechanism arranged to grasp the strings of the successive bags and draw and tie the strings in a single-bow knot.

19. Bag handling mechanism of the class described, comprising a rotary turret, spaced bag holders thereon, string supports for each spout, a bag conveyor, spaced bag holders thereon, string supports for each holder, means for advancing the turret and conveyor concurrently and intermittently to associate a spout which each holder at a filling station, and means for moving the holder to insert a bag carried by a spout in the corresponding holder, the respective string supports being constructed and arranged to effect automatic transfer of strings from the spout supports to the holder supports, and tying mechanism arranged to grasp the strings of the successive bags at a point beyond the filling station and draw and tie the strings in a single-bow knot.

20. A bag handling machine comprising a spout on which a strung bag is positioned for filling, means for advancing the spout, a bag holder in which the bag is inserted, string supports associated with the spout and in which the strings are located while the bag is on the spout, string supports associated with bag holder, the parts being arranged so that the strings are automatically transferred from the spout string supports to the holder string supports and positioned therein for cooperation with subsequently-acting tying mechanism, and automatic tying mechanism adjacent the conveyor and comprising means for grasping the strings positioned by the string supports of the successive holders, removing the strings from supports, drawing them to close the bag and tying them.

21. Bag handling mechanism of the class described, comprising a rotary turret, spaced bag spouts thereon, string supports for each spout, a bag conveyor, spaced bag holders thereon, string supports for each holder, means for advancing the turret and conveyor concurrently and intermittently to associate a spout with each holder at a filling station, means for moving the holder, the respective string supports being constructed and arranged to effect automatic transfer of strings from the spout supports to the holder supports, and automatic tying mechanism adjacent the conveyor at a point beyond the filling position and comprising means to grasp the strings positioned by the string supports of the successive holders, remove the strings from the supports, draw them to close the bag, and tie them in a bow knot.

22. Bag handling mechanism of the class described, comprising a rotary turret, spaced bag spouts thereon, string supports for each spout, a bag conveyor, spaced bag holders thereon, string supports for each holder, means for advancing the turret and conveyor concurrently and intermittently to associate a spout with each holder at a filling station, means for moving the holder to insert a bag carried by a spout in the corresponding holder, the respective string supports being constructed and arranged to effect automatic transfer of strings from the spout supports to the holder supports, and automatic tying mechanism adjacent the conveyor at a point beyond the filling position and comprising means to grasp the strings positioned by the string supports of the successive holders, remove the strings from the supports, draw them to close the bag, tie them in a single-bow knot.

23. A bag handling machine comprising a spout on which a strung bag is positioned for filling, means for advancing the spout, a bag holder in which the bag is inserted, string supports associated with the spout and in which the strings are located while the bag is on the spout, string supports associated with the bag holder, the parts being arranged so that the strings are automatically transferred from the spout string supports to the holder string supports, means for applying labels to successively advancing bags, means for ejecting the bags from the successive conveyor holders and advancing them to the labeling means, and means intermediate the filling position and the labeling means, for automatically drawing and tying the strings of the successive bags.

24. A bag handling machine comprising a spout on which a strung bag is positioned for filling, means for advancing the spout, a bag holder in which the bag is inserted, string supports associated with the spout and in which the strings are located while the bag is on the spout, string supports associated with the bag holder, the parts being arranged so that the strings are automatically transferred from the spout string supports to the holder string supports, means for automatically applying stamps to successively advancing bags, means for ejecting the bags from the successive conveyor holders and advancing them to the stamping means, and means intermediate the filling position and the stamping means for automatically drawing and tying the strings of the successive bags.

25. Bag handling mechanism of the class described, comprising a rotary turret, spaced bag spouts thereon, string supports for each spout, a bag conveyor, spaced bag holders thereon, string supports for each holder, means for advancing the turret and conveyor concurrently and intermittently to associate a spout with each holder at a filling station, means for moving the holder to insert a bag carried by a spout in the corresponding holder, the respective string supports being constructed and arranged to effect automatic transfer of strings from the spout supports to the holder supports, means for automatically applying stamps to successively advancing bags, means for ejecting the bags from the successive conveyor holders and advancing them to the stamping means, and means intermediate the filling position and the stamping means for automatically drawing and tying the strings of the successive bags.

26. A bag handling machine comprising a spout on which a strung bag is positioned for filling, means for advancing the spout, a bag holder in which the bag is inserted, string supports associated with the spout and in which the strings are located while the bag is on the spout, string supports associated with the bag holder, the parts being arranged so that the strings are automatically transferred from the spout string supports to the holder string supports, means for applying labels to successive advancing bags, means for ejecting the bags from the successive conveyor holders and advancing them to the labeling means, means intermediate the filling position and the labeling means for automatically drawing and tying the strings of the successive bags, and means intermediate the filling and labeling positions for automatically supplying a filled and tied bag in place of a bag which is missing in the regular order of the bag advance.

27. A bag handling machine comprising a spout on which a strung bag is positioned for filling, means for advancing the spout, a bag holder in which the bag is inserted, string supports associated with the spout and in which the strings are located while the bag is on the spout, string supports associated with the bag holder, the parts being arranged so that the strings are automatically transferred from the spout string supports to the holder string supports, means for automatically applying stamps to successively advancing bags, means for ejecting the bags from the successive conveyor holders and advancing them to the stamping means, means intermediate the filling position and the stamping means for automatically drawing and tying the strings of the successive bags, and means intermediate the filling and stamping positions for automatically supplying a filled and tied bag in place of a bag which is missing in the regular order of the bag advance.

28. Bag handling mechanism of the class described, comprising means for applying stamps to successive filled bags, a rotary turret, spaced bag spouts thereon, string supports for each spout, a bag conveyor, spaced bag holders thereon, string supports for each holder, means for advancing the turret and conveyor concurrently and intermittently to associate a spout with each holder at a filling station, means for moving the holder to insert a bag carried by a spout in the corresponding holder, the respective string supports being constructed and arranged to effect automatic transfer of strings from the spout supports to the holder supports, and means intermediate the filling and stamping positions for automatically supplying a filled and tied bag in place of a bag which is missing in the regular order of the bag advance.

29. A bag handling machine comprising means for applying labels to successive filled bags, a spout on which a strung bag is positioned for filling, means for advancing the spout, a bag holder in which the bag is inserted, string supports associated with the spout and in which the strings are located while the bag is on the spout, string supports associated with the bag holder, the parts being arranged so that the strings are automatically transferred from the spout string supports to the holder supports and positioned therein for cooperation with subsequently-acting tying mechanism, and means intermediate the tying and labeling positions for automatically supplying and advancing a filled and tied bag in the place of a bag which is missing in the regular order of advance.

30. A bag handling machine comprising a spout on which a strung bag is positioned for filling, means for advancing the spout, a bag holder in which the bag is inserted, string supports associated with the spout and in which the strings are located while the bag is on the spout, string supports associated with the bag holder, the parts being arranged so that the strings are automatically transferred from the spout string supports to the holder string supports, means for automatically applying stamps to successively advancing bags, means for ejecting the bags from the successive conveyor holders and advancing them to the stamping means, means intermediate the filling position and the stamping means for automatically drawing and tying the strings of the successive bags, and means intermediate the tying and stamping position for automatically supplying and advancing a filled and tied bag in the place of a bag which is missing in the regular order of advance.

31. Bag handling mechanism of the class described, comprising means for applying stamps to successive filled bags, a rotary turret, spaced bag spouts thereon, string supports for each spout, a bag conveyor, spaced bag holders thereon, string supports for each holder, means for advancing the turret and conveyor concurrently and intermittently to associate a spout with each holder at a filling station, means for moving the holder to insert a bag carried by a spout in the corresponding holder, the respective string supports being constructed and arranged to effect automatic transfer of strings from the spout supports to the holder supports, and means intermediate the tying and stamping position for automatically supplying and advancing a filled and tied bag in the place of a bag which is missing in the regular order of advance.

32. Bag advancing and tying mechanism comprising means for advancing successive filled bags with open mouths having oppositely extending draw strings and string supports maintaining portions of the strings horizontally extending from opposite sides of the mouth, and tying mechanism comprising movable loopers and tiers, means for operating the loopers to bring them to cooperative positions above the bag mouth, and means for operating the tiers to grasp the horizontal string portions, remove them from the string supports, draw the strings to close the bag mouth, and wrap the strings around the loopers to form by cooperation with the retracting movement of the loopers a bow knot.

33. Bag advancing and tying mechanism comprising means for advancing successive filled bags with open mouths having oppositely extending draw strings and supports maintaining portions of the strings horizontally extending from opposite sides of the mouth, and tying mechanism comprising movable loopers and tiers, means for operating the loopers to bring them to cooperative positions above the bag mouth, and means for operating the tiers to grasp the horizontal string portions, remove them from the string supports, draw the strings to close the bag mouth, and wrap the strings around the loopers to form by cooperation with the retracting movement of the loopers a single-bow knot.

34. Bag advancing and tying mechanism comprising means for advancing successive filled bags with open mouths having oppositely extending draw strings and string supports maintaining portions of the strings horizontally extending from opposite sides of the mouth, and tying mechanism comprising movable loopers and tiers, means for operating the loopers to bring them to cooperative positions above the bag mouth, and means for operating the tiers to grasp the horizontal string portions, remove them from the string supports, draw the strings to close the bag mouth, and wrap the strings around the loopers to form by cooperation with the retracting movement of the loopers a bow knot, and a guard arranged to engage and direct a tagged bag string in its rotative movement due to the tying operation.

35. Bag advancing and tying mechanism comprising means for advancing successive filled bags with open mouths having oppositely extending draw strings and string supports maintaining portions of the strings horizontally extending from opposite sides of the mouth, and tying mechanism comprising movable loopers and tiers, means for operating the loopers to bring them to cooperative positions above the bag mouth, means for operating the tiers to grasp the horizontal string portions, remove them from the string supports, draw the strings to close the bag mouth, and wrap the strings around the loopers to form by cooperation with the retracting movement of the loopers a bow knot, and an approximately part-circular guard plate carried by one of the loopers and arranged to engage and direct a tagged bag string in its rotative movement due to the tying operation.

36. Bag advancing and tying mechanism comprising means for advancing successive filled bags with open mouths having oppositely extending draw strings and string supports maintaining portions of the strings horizontally extending from opposite sides of the mouth, and tying mechanism comprising movable loopers and tiers, means for operating the loopers to bring them to cooperative positions above the bag mouth, means for operating the tiers to grasp the horizontal string portions, remove them from the string supports, draw the strings to close the bag mouth, and wrap the strings around the loopers to form by cooperation with the retracting movement of the loopers a bow knot, and a guard or baffle arranged to be engaged by a tag on one of the bag strings to maintain the string in proper position at the end of the tying operation.

37. Bag advancing and tying mechanism comprising means for advancing successive filled bags with open mouths having oppositely extending draw strings and string supports maintaining portions of the strings horizontally extending from opposite sides of the mouth, and tying mechanism comprising movable loopers and tiers, means for operating the loopers to bring them to cooperative positions above the bag mouth, means for operating the tiers to grasp the horizontal string portions, remove them from the string supports, draw the strings to close the bag mouth, and wrap the strings around the loopers to form by cooperation with the retracting movement of the loopers a bow knot, and string releasers arranged to advance and free the strings from the tiers after the latter have wrapped the strings around the loopers and located them for the final looper action.

38. Bag advancing and tying mechanism comprising means for advancing successive filled bags with open mouths having oppositely extending draw strings and string supports maintaining portions of the strings horizontally extending from opposite sides of the mouth, and tying mechanism comprising movable loopers and tiers, means for operating the loopers to bring them to cooperative positions above the bag mouth, means for operating the tiers to grasp the horizontal string portions, remove them from the string supports, draw the strings to close the bag mouth, and wrap the strings around the loopers to form by cooperation with the retracting movement of the loopers a bow knot, and string releaser blades and means for moving them to and fro to release strings from the tiers at the end of the active tier movements.

39. Tying mechanism for purposes described, comprising tiers and loopers, a string gripper on each looper, and a string notch on one of the loopers arranged outwardly from its gripper to receive and position the string portion so as to avoid drawing said portion through a loop in the formation of a single-bow knot.

40. In bag handling mechanism, a conveyor, a plurality of spaced bag holders thereon, tying mechanism including string releasers carried by swinging supports, and a tag positioning device carried on one of said supports and arranged to engage a tag or tagged string located upon an approximately horizontal surface of a bag in one of said holders to remove the tag or tagged string and properly position it for subsequent operations.

41. In bag handling mechanism, a conveyor, a plurality of spaced bag holders thereon, tying mechanism including string releasers, oscillating levers supporting said releasers, an arm pivotally connected to one of said levers, a brush on said arm arranged to cooperate with a tag or tagged string located on the approximately horizontal surface of a bag at one point in the conveyor travel, a pawl on a stationary support, and notches in the brush arm cooperating with the pawl to elevate the brush in its advance and drop it on return movement in contact with the tag or tagged string to remove the tag to a favorable position for subsequent operations.

42. In bag handling mechanism, an auxiliary bag magazine, means for removing it to and fro, and means for automatically permitting or restraining magazine movement in accordance with the presentation or non-presentation of bags at regular intervals adjacent to the magazine.

43. In bag handling mechanism, in combination with a bag conveyor and means for moving successive bags from the conveyor, an auxiliary bag magazine arranged to hold a stack of filled and tied bags, means for moving the magazine to and fro, latch mechanism cooperating with the magazine, and means by which the latch action is controlled by presence or absence of a bag on the conveyor at a predetermined point adjacent the latch mechanism.

44. In bag handling mechanism, in combination with a bag conveyor and means for moving successive bags from the conveyor, an auxiliary bag magazine arranged to hold a stack of filled and tied bags, means for moving the magazine up and down, latch mechanism cooperating with the magazine, and means by which the latch action is controlled by presence or absence of a bag on the conveyor at a predetermined point adjacent the latch mechanism.

45. A bag magazine for purposes described, arranged to support a stack of filled and tied bags and having in one side a vertical string slot to accommodate tagged strings with the tags located outside the magazine.

46. A bag magazine for purposes described, arranged to support a stack of filled and tied bags and having in one side a vertical string slot to accommodate tagged strings with the tags located outside the magazine, the slot having its lower end forwardly curved for exit of the strings.

47. A bag magazine for purposes described, arranged to support a stack of filled and tied bags and having a tag supporting and guiding plate adjacent the lower end of the magazine.

48. A bag magazine for purposes described, arranged to support a stack of filled and tied bags and having a sight opening in one side, and also having in one side a vertical string slot to accommodate tagged strings with the tags located outside the magazine and adjacent to the slots.

49. A bag magazine for purposes described, arranged to support a stack of filled and tied bags and having a sight opening in one side, and also having in one side a vertical string slot to accommodate tagged strings with the tags located outside the magazine and adjacent to the slots, the slot having its lower end forwardly curved for exit of the strings.

50. A bag magazine for purposes described, arranged to support a stack of filled and tied bags and having a sight opening in one side, also having in one side a vertical string slot to accommodate tagged strings with the tags located outside the magazine and adjacent to the slots, the slot having its lower end forwardly curved for exit of the strings, and a tag supporting and guiding plate fixed to the magazine at one side and near the lower end thereof.

51. In mechanism of the class described, a bag holder and a string support at one side thereof faced away from a bag located in the holder and comprising a string eye and a diagonal slot communicating therewith.

52. In mechanism of the class described, a bag holder and a string support at one side thereof faced away from a bag located in the holder and comprising a string eye and a diagonal slot communicating therewith, and also having a string notch to locate or support a tagged bag string.

53. In mechanism of the class described, in association with a bag spout, a string supporting arm adjacent the spout and spaced therefrom, and having at its lower end a string notch, and a spring-actuated gripper cooperating with the notch.

54. In mechanism of the class described, in association with a bag spout, a string supporting arm adjacent the spout and spaced therefrom, and having at its lower end a string notch, a gripper blade movably located on the arm to yieldingly grip a string against one face of the string notch, and a pivot spring of bent wire having a portion passing through the arm and gripper blade and acting as a pivot, another portion engaging the arm, and another portion passing through an aperture in the arm and engaging in the gripper blade to yieldingly urge the latter to active position.

55. In mechanism of the class described, in association with a bag spout, a spring supporting arm adjacent the spout and spaced therefrom, and having at its lower end a flared string notch, and a spring-actuated gripper cooperating with the notch.

56. In mechanism of the class described, in combination with a rotary turret having spaced bag spouts and string supports adjacent to the spouts, a conveyor having spaced bag holders, and means for advancing the turret and conveyor concurrently and intermittently to locate successive spouts and holders cooperatively at a filling position, a curved guard plate adjacent the turret spouts and string supports and extending approximately to filling position to engage and properly locate a tagged string advancing toward filling position.

57. In combination with a machine for filling, advancing and stamping strung bags, automatic tying mechanism arranged to grasp, draw and tie the strings of the successive advancing bags anterior to stamping position.

58. In a machine for filling, advancing and stamping cotton tobacco bags, including a conveyor having spaced bag holders, means for inserting bags successively therein and filling them, means for ejecting the bags successively from the conveyor holders and means for stamping the successive bags so ejected, the combination therewith of automatic tying mechanism located adjacent the conveyor posterior to filling position and anterior to the point of bag ejection, and comprising tiers and loopers and means for automatically operating them to grasp and tie the strings of bags successively positioned by the conveyor.

59. In a machine for filling, advancing and stamping cotton tobacco bags, including a conveyor having spaced bag holders, means for inserting bags successively therein and filling them, means for ejecting the bags successively from the conveyor holders and means for stamping the successive bags so ejected, the combination therewith of automatic tying mechanism located adjacent the conveyor posterior to filling position and anterior to the point of bag ejection, and comprising tiers and loopers and means for automatically operating them to grasp and tie the strings of bags successively positioned by the conveyor, a frame supporting and tying mechanism, a drive shaft therein connected to drive the tying mechanism, and a driving connection from said shaft to a shaft of said bag filling and stamping machine.

60. In a known machine for filling, advancing and stamping cotton tobacco bags, including a conveyor having spaced bag holders, means for inserting bags successively therein and filling them, means for ejecting the bags successively from the conveyor holders and means for stamping the successive bags so ejected, the combination therewith of automatic tying mechanism located above the conveyor posterior to filling position and anterior to the point of bag ejection and comprising tiers and loopers, and means for automatically operating them to grasp and tie the strings of bags successively positioned by the conveyor.

61. In a known machine for filling, advancing and stamping cotton tobacco bags, including a conveyor having spaced bag holders, means for inserting bags successively therein and filling them, means for ejecting the bags successively from the conveyor holders and means for stamping the successive bags so ejected, the combination therewith of automatic tying mechanism located above the conveyor posterior to filling position and anterior to the point of bag ejection and comprising tiers and loopers and means for automatically operating them to grasp and tie the strings of bags successively positioned by the conveyor, a frame supporting the tying mechanism, a drive shaft therein connected to drive the tying mechanism, and a driving connection from said shaft to a shaft of said known machine.

62. Bag handling mechanism comprising means for advancing successive filled bags past a tying station, means for applying labels to the successive bags, and means for automatically supplying a filled bag in the place of a bag which is missing in the regular order of bag advance.

63. Bag handling mechanism comprising means for advancing successive filled bags with strings arranged conveniently for tying, means for advancing the bags beyond a point where normally the strings are drawn and tied, means for applying labels to the successive bags, and means anterior to labeling position for automatically supplying a filled and tied bag in the place of a bag which is missing in the regular order of bag advance.

64. Bag handling mechanism comprising means for advancing past a tying position successive filled bags, means beyond the tying position for applying labels to the successive bags, a magazine arranged to hold a number of filled and tied bags, and means for automatically supplying a bag from the magazine in the place of a bag which is missing in the regular order of bag advance.

65. Bag handling mechanism comprising means for advancing past a tying position successive filled bags, means beyond the tying position for applying labels to the successive bags, a magazine arranged to hold a number of filled and tied bags, means for moving the magazine to position a bag therein in the line of bag advance, and means regulated by presence or absence of a bag in the regular order of bag advance anterior to the magazine to control the positioning of the magazine so that a bag is supplied from the magazine in place of any bag missing in the regular order.

Signed at Durham, in the county of Durham and State of North Carolina, this 29th day of January, A. D. 1924.

JOHN T. DALTON.